US008391630B2

(12) United States Patent
Mathew

(10) Patent No.: US 8,391,630 B2
(45) Date of Patent: Mar. 5, 2013

(54) SYSTEM AND METHOD FOR POWER REDUCTION WHEN DECOMPRESSING VIDEO STREAMS FOR INTERFEROMETRIC MODULATOR DISPLAYS

(75) Inventor: Mithran Mathew, Mountain View, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 1012 days.

(21) Appl. No.: 11/317,421

(22) Filed: Dec. 22, 2005

(65) Prior Publication Data

US 2007/0147688 A1 Jun. 28, 2007

(51) Int. Cl.
*G06K 9/40* (2006.01)

(52) U.S. Cl. ........ 382/264; 382/260; 382/261; 345/211; 345/212

(58) Field of Classification Search .................. 382/260, 382/261, 264; 345/211
See application file for complete search history.

(56) References Cited

U.S. PATENT DOCUMENTS

| | | | |
|---|---|---|---|
| 3,982,239 | A | 9/1976 | Sherr |
| 4,403,248 | A | 9/1983 | te Velde |
| 4,441,791 | A | 4/1984 | Hornbeck |
| 4,459,182 | A | 7/1984 | te Velde |
| 4,482,213 | A | 11/1984 | Piliavin et al. |
| 4,500,171 | A | 2/1985 | Penz et al. |
| 4,519,676 | A | 5/1985 | te Velde |
| 4,566,935 | A | 1/1986 | Hornbeck |
| 4,571,603 | A | 2/1986 | Hornbeck et al. |
| 4,596,992 | A | 6/1986 | Hornbeck |
| 4,615,595 | A | 10/1986 | Hornbeck |
| 4,662,746 | A | 5/1987 | Hornbeck |
| 4,681,403 | A | 7/1987 | te Velde et al. |
| 4,709,995 | A | 12/1987 | Kuribayashi et al. |
| 4,710,732 | A | 12/1987 | Hornbeck |
| 4,856,863 | A | 8/1989 | Sampsell et al. |
| 4,859,060 | A | 8/1989 | Katagiri et al. |
| 4,954,789 | A | 9/1990 | Sampsell |
| 4,956,619 | A | 9/1990 | Hornbeck |
| 4,982,184 | A | 1/1991 | Kirkwood |

(Continued)

FOREIGN PATENT DOCUMENTS

| | | | |
|---|---|---|---|
| EP | 0295802 | A | 12/1988 |
| EP | 0300754 | A2 | 1/1989 |

(Continued)

OTHER PUBLICATIONS

Chen, H.F. et al., "Backlight Local Dimming Algorithm for High Contrast LCD-TV", Oct. 12 ,2006, Proc. of ASIC, pp. 168-171.*

(Continued)

*Primary Examiner* — Jason M Repko
*Assistant Examiner* — Gandhi Thirugnanam
(74) *Attorney, Agent, or Firm* — Knobbe Martens Olson & Bear LLP

(57) ABSTRACT

A system and method for processing image data to be displayed on a display device, where the display device requires more power to be driven to display image data comprising particular spatial frequencies in one dimension than to be driven to display image data comprising the particular spatial frequencies in a second dimension. The method includes receiving image data and filtering the received image data such that the image data at particular spatial frequencies in a first dimension are attenuated more than the image data at particular spatial frequencies in a second dimension.

35 Claims, 13 Drawing Sheets

U.S. PATENT DOCUMENTS 5,018,256 A 5/1991 Hornbeck
5,028,939 A 7/1991 Hornbeck et al.
5,037,173 A 8/1991 Sampsell et al.
5,055,833 A 10/1991 Hehlen et al.
5,061,049 A 10/1991 Hornbeck
5,078,479 A 1/1992 Vuilleumier
5,079,544 A 1/1992 DeMond et al.
5,083,857 A 1/1992 Hornbeck
5,096,279 A 3/1992 Hornbeck et al.
5,099,353 A 3/1992 Hornbeck
5,124,834 A 6/1992 Cusano et al.
5,142,405 A 8/1992 Hornbeck
5,142,414 A 8/1992 Koehler et al.
5,162,787 A 11/1992 Thompson et al.
5,168,406 A 12/1992 Nelson
5,170,156 A 12/1992 DeMond et al.
5,172,262 A 12/1992 Hornbeck
5,179,274 A 1/1993 Sampsell
5,192,395 A 3/1993 Boysel et al.
5,192,946 A 3/1993 Thompson et al.
5,206,629 A 4/1993 DeMond et al.
5,212,582 A 5/1993 Nelson
5,214,419 A 5/1993 DeMond et al.
5,214,420 A 5/1993 Thompson et al.
5,216,537 A 6/1993 Hornbeck
5,226,099 A 7/1993 Mignardi et al.
5,227,900 A 7/1993 Inaba et al.
5,231,532 A 7/1993 Magel et al.
5,233,385 A 8/1993 Sampsell
5,233,456 A 8/1993 Nelson
5,233,459 A 8/1993 Bozler et al.
5,254,980 A 10/1993 Hendrix et al.
5,272,473 A 12/1993 Thompson et al.
5,278,652 A 1/1994 Urbanus et al.
5,280,277 A 1/1994 Hornbeck
5,285,196 A 2/1994 Gale
5,287,096 A 2/1994 Thompson et al.
5,287,215 A 2/1994 Warde et al.
5,296,950 A 3/1994 Lin et al.
5,305,640 A 4/1994 Boysel et al.
5,312,513 A 5/1994 Florence et al.
5,323,002 A 6/1994 Sampsell et al.
5,325,116 A 6/1994 Sampsell
5,327,286 A 7/1994 Sampsell et al.
5,331,454 A 7/1994 Hornbeck
5,339,116 A 8/1994 Urbanus et al.
5,365,283 A 11/1994 Doherty et al.
5,411,769 A 5/1995 Hornbeck
5,444,566 A 8/1995 Gale et al.
5,446,479 A 8/1995 Thompson et al.
5,448,314 A 9/1995 Heimbuch et al.
5,452,024 A 9/1995 Sampsell
5,454,906 A 10/1995 Baker et al.
5,457,493 A 10/1995 Leddy et al.
5,457,566 A 10/1995 Sampsell et al.
5,459,602 A 10/1995 Sampsell
5,461,411 A 10/1995 Florence et al.
5,488,505 A 1/1996 Engle
5,489,952 A 2/1996 Gove et al.
5,497,172 A 3/1996 Doherty et al.
5,497,197 A 3/1996 Gove et al.
5,499,062 A 3/1996 Urbanus
5,506,597 A 4/1996 Thompson et al.
5,515,076 A 5/1996 Thompson et al.
5,517,347 A 5/1996 Sampsell
5,523,802 A * 6/1996 Sugihara et al. .............. 348/743
5,523,803 A 6/1996 Urbanus et al.
5,526,051 A 6/1996 Gove et al.
5,526,172 A 6/1996 Kanack
5,526,688 A 6/1996 Boysel et al.
5,535,047 A 7/1996 Hornbeck
5,548,301 A 8/1996 Kornher et al.
5,551,293 A 9/1996 Boysel et al.
5,552,924 A 9/1996 Tregilgas
5,552,925 A 9/1996 Worley
5,563,398 A 10/1996 Sampsell
5,566,284 A * 10/1996 Wakayama ................... 345/587
5,567,334 A 10/1996 Baker et al.
5,570,135 A 10/1996 Gove et al.
5,578,976 A 11/1996 Yao
5,581,272 A 12/1996 Conner et al.
5,583,688 A 12/1996 Hornbeck
5,589,852 A 12/1996 Thompson et al.
5,597,736 A 1/1997 Sampsell
5,598,565 A 1/1997 Reinhardt
5,600,383 A 2/1997 Hornbeck
5,602,671 A 2/1997 Hornbeck
5,606,441 A 2/1997 Florence et al.
5,608,468 A 3/1997 Gove et al.
5,610,438 A 3/1997 Wallace et al.
5,610,624 A 3/1997 Bhuva
5,610,625 A 3/1997 Sampsell
5,612,713 A 3/1997 Bhuva et al.
5,619,061 A 4/1997 Goldsmith et al.
5,619,365 A 4/1997 Rhoades et al.
5,619,366 A 4/1997 Rhoads et al.
5,629,790 A 5/1997 Neukermans et al.
5,633,652 A 5/1997 Kanbe et al.
5,636,052 A 6/1997 Arney et al.
5,638,084 A 6/1997 Kalt
5,638,946 A 6/1997 Zavracky
5,646,768 A 7/1997 Kaeriyama
5,650,881 A 7/1997 Hornbeck
5,654,741 A 8/1997 Sampsell et al.
5,657,099 A 8/1997 Doherty et al.
5,659,374 A 8/1997 Gale, Jr. et al.
5,665,997 A 9/1997 Weaver et al.
5,699,075 A 12/1997 Miyamoto
5,745,193 A 4/1998 Urbanus et al.
5,745,281 A 4/1998 Yi et al.
5,754,160 A 5/1998 Shimizu et al.
5,771,116 A 6/1998 Miller et al.
5,784,189 A 7/1998 Bozler et al.
5,784,212 A 7/1998 Hornbeck
5,808,780 A 9/1998 McDonald
5,818,095 A 10/1998 Sampsell
5,828,367 A 10/1998 Kuga
5,835,255 A 11/1998 Miles
5,842,088 A 11/1998 Thompson
5,867,302 A 2/1999 Fleming et al.
5,912,758 A 6/1999 Knipe et al.
5,943,030 A * 8/1999 Minamibayashi .............. 345/60
5,943,158 A 8/1999 Ford et al.
5,959,763 A 9/1999 Bozler et al.
5,966,235 A 10/1999 Walker et al.
5,986,796 A 11/1999 Miles
6,028,690 A 2/2000 Carter et al.
6,038,056 A 3/2000 Florence et al.
6,040,937 A 3/2000 Miles
6,049,317 A 4/2000 Thompson et al.
6,055,090 A 4/2000 Miles
6,061,075 A 5/2000 Nelson et al.
6,099,132 A 8/2000 Kaeriyama
6,100,872 A 8/2000 Aratani et al.
6,113,239 A 9/2000 Sampsell et al.
6,144,493 A * 11/2000 Okuyama et al. ............. 359/566
6,147,790 A 11/2000 Meier et al.
6,160,833 A 12/2000 Floyd et al.
6,180,428 B1 1/2001 Peeters et al.
6,201,633 B1 3/2001 Peeters et al.
6,232,936 B1 5/2001 Gove et al.
6,275,326 B1 8/2001 Bhalla et al.
6,282,010 B1 8/2001 Sulzbach et al.
6,295,154 B1 9/2001 Laor et al.
6,296,636 B1 * 10/2001 Cheng et al. .................... 606/32
6,300,922 B1 * 10/2001 Teggatz ....................... 345/75.2
6,304,297 B1 10/2001 Swan
6,323,982 B1 11/2001 Hornbeck
6,327,071 B1 12/2001 Kimura
6,343,100 B1 * 1/2002 Fujiwara et al. ......... 375/240.17
6,356,085 B1 3/2002 Ryat et al.
6,356,254 B1 3/2002 Kimura
6,429,601 B1 8/2002 Friend et al.
6,433,917 B1 8/2002 Mei et al.
6,447,126 B1 9/2002 Hornbeck
6,465,355 B1 10/2002 Horsley
6,466,358 B2 10/2002 Tew

| | | | | |
|---|---|---|---|---|
| 6,473,274 | B1 | 10/2002 | Maimone et al. | |
| 6,480,177 | B2 | 11/2002 | Doherty et al. | |
| 6,496,122 | B2 | 12/2002 | Sampsell | |
| 6,501,107 | B1 | 12/2002 | Sinclair et al. | |
| 6,507,330 | B1 | 1/2003 | Handschy et al. | |
| 6,507,331 | B1 | 1/2003 | Schlangen et al. | |
| 6,545,335 | B1 | 4/2003 | Chua et al. | |
| 6,548,908 | B2 | 4/2003 | Chua et al. | |
| 6,549,338 | B1 | 4/2003 | Wolverton et al. | |
| 6,552,840 | B2 | 4/2003 | Knipe | |
| 6,574,033 | B1 | 6/2003 | Chui et al. | |
| 6,589,625 | B1 | 7/2003 | Kothari et al. | |
| 6,593,934 | B1 | 7/2003 | Liaw et al. | |
| 6,600,201 | B2 | 7/2003 | Hartwell et al. | |
| 6,606,175 | B1 | 8/2003 | Sampsell et al. | |
| 6,625,047 | B2 | 9/2003 | Coleman, Jr. | |
| 6,630,786 | B2 | 10/2003 | Cummings et al. | |
| 6,632,698 | B2 | 10/2003 | Ives | |
| 6,636,187 | B2 | 10/2003 | Tajima et al. | |
| 6,642,971 | B2 * | 11/2003 | Takeuchi | 348/746 |
| 6,643,069 | B2 | 11/2003 | Dewald | |
| 6,650,455 | B2 | 11/2003 | Miles | |
| 6,666,561 | B1 | 12/2003 | Blakley | |
| 6,674,090 | B1 | 1/2004 | Chua et al. | |
| 6,674,562 | B1 | 1/2004 | Miles | |
| 6,680,792 | B2 | 1/2004 | Miles | |
| 6,710,908 | B2 | 3/2004 | Miles et al. | |
| 6,741,377 | B2 | 5/2004 | Miles | |
| 6,741,384 | B1 | 5/2004 | Martin et al. | |
| 6,741,503 | B1 | 5/2004 | Farris et al. | |
| 6,747,785 | B2 | 6/2004 | Chen et al. | |
| 6,762,873 | B1 | 7/2004 | Coker et al. | |
| 6,768,520 | B1 * | 7/2004 | Rilly et al. | 348/730 |
| 6,775,174 | B2 | 8/2004 | Huffman et al. | |
| 6,778,155 | B2 | 8/2004 | Doherty et al. | |
| 6,781,643 | B1 | 8/2004 | Watanabe et al. | |
| 6,787,384 | B2 | 9/2004 | Okumura | |
| 6,787,438 | B1 | 9/2004 | Nelson | |
| 6,788,520 | B1 | 9/2004 | Behin et al. | |
| 6,794,119 | B2 | 9/2004 | Miles | |
| 6,811,267 | B1 | 11/2004 | Allen et al. | |
| 6,813,060 | B1 | 11/2004 | Garcia et al. | |
| 6,819,469 | B1 | 11/2004 | Koba | |
| 6,819,717 | B1 * | 11/2004 | Sasai et al. | 375/240.29 |
| 6,822,628 | B2 | 11/2004 | Dunphy et al. | |
| 6,829,132 | B2 | 12/2004 | Martin et al. | |
| 6,853,129 | B1 | 2/2005 | Cummings et al. | |
| 6,855,610 | B2 | 2/2005 | Tung et al. | |
| 6,859,218 | B1 | 2/2005 | Luman et al. | |
| 6,861,277 | B1 | 3/2005 | Monroe et al. | |
| 6,862,022 | B2 | 3/2005 | Slupe | |
| 6,862,029 | B1 | 3/2005 | D'Souza et al. | |
| 6,867,896 | B2 | 3/2005 | Miles | |
| 6,870,581 | B2 | 3/2005 | Li et al. | |
| 6,903,860 | B2 | 6/2005 | Ishii | |
| 7,013,161 | B2 * | 3/2006 | Morris | 455/522 |
| 7,034,783 | B2 | 4/2006 | Gates et al. | |
| 7,046,853 | B2 * | 5/2006 | Okada | 382/233 |
| 7,111,179 | B1 * | 9/2006 | Girson et al. | 713/300 |
| 7,119,786 | B2 * | 10/2006 | Cui | 345/102 |
| 7,123,216 | B1 | 10/2006 | Miles | |
| 7,161,728 | B2 | 1/2007 | Sampsell et al. | |
| 7,202,850 | B2 * | 4/2007 | Kitagawa | 345/102 |
| 7,230,996 | B2 * | 6/2007 | Matsuura et al. | 375/296 |
| 7,254,776 | B2 * | 8/2007 | Ejima et al. | 715/726 |
| 7,262,560 | B2 * | 8/2007 | Jaffar et al. | 315/291 |
| 7,327,510 | B2 | 2/2008 | Cummings et al. | |
| 7,400,489 | B2 | 7/2008 | Van Brocklin et al. | |
| 7,444,034 | B1 * | 10/2008 | Thistle et al. | 382/254 |
| 7,515,160 | B2 * | 4/2009 | Kerofsky | 345/600 |
| 7,528,883 | B2 * | 5/2009 | Hsu | 348/345 |
| 7,710,434 | B2 * | 5/2010 | Gu | 345/589 |
| 7,760,960 | B2 * | 7/2010 | Yan et al. | 382/261 |
| 2001/0003487 | A1 | 6/2001 | Miles | |
| 2001/0012051 | A1 * | 8/2001 | Hara et al. | 348/14.01 |
| 2001/0026250 | A1 | 10/2001 | Inoue et al. | |
| 2001/0034075 | A1 | 10/2001 | Onoya | |
| 2001/0040536 | A1 | 11/2001 | Tajima et al. | |
| 2001/0043171 | A1 | 11/2001 | Van Gorkom et al. | |
| 2001/0046081 | A1 | 11/2001 | Hayashi et al. | |
| 2001/0051014 | A1 | 12/2001 | Behin et al. | |
| 2001/0052887 | A1 | 12/2001 | Tsutsui et al. | |
| 2002/0000959 | A1 | 1/2002 | Colgan et al. | |
| 2002/0005827 | A1 | 1/2002 | Kobayashi | |
| 2002/0012159 | A1 | 1/2002 | Tew | |
| 2002/0015215 | A1 | 2/2002 | Miles | |
| 2002/0024529 | A1 * | 2/2002 | Miller et al. | 345/690 |
| 2002/0024711 | A1 | 2/2002 | Miles | |
| 2002/0036304 | A1 | 3/2002 | Ehmke et al. | |
| 2002/0050882 | A1 | 5/2002 | Hyman et al. | |
| 2002/0054424 | A1 | 5/2002 | Miles et al. | |
| 2002/0075226 | A1 | 6/2002 | Lippincott | |
| 2002/0075555 | A1 | 6/2002 | Miles | |
| 2002/0093722 | A1 | 7/2002 | Chan et al. | |
| 2002/0097133 | A1 | 7/2002 | Charvet et al. | |
| 2002/0113782 | A1 * | 8/2002 | Verberne et al. | 345/204 |
| 2002/0126364 | A1 | 9/2002 | Miles | |
| 2002/0179421 | A1 | 12/2002 | Williams et al. | |
| 2002/0181592 | A1 * | 12/2002 | Gagarin et al. | 375/240.18 |
| 2002/0186108 | A1 | 12/2002 | Hallbjorner | |
| 2003/0004272 | A1 | 1/2003 | Power | |
| 2003/0007205 | A1 * | 1/2003 | Lee et al. | 359/110 |
| 2003/0011728 | A1 * | 1/2003 | Battersby | 349/106 |
| 2003/0020699 | A1 | 1/2003 | Nakatani et al. | |
| 2003/0043157 | A1 | 3/2003 | Miles | |
| 2003/0051177 | A1 * | 3/2003 | Koo | 713/300 |
| 2003/0072070 | A1 | 4/2003 | Miles | |
| 2003/0122773 | A1 | 7/2003 | Washio et al. | |
| 2003/0128282 | A1 * | 7/2003 | Sudo | 348/222.1 |
| 2003/0137215 | A1 | 7/2003 | Cabuz | |
| 2003/0137521 | A1 | 7/2003 | Zehner et al. | |
| 2003/0189536 | A1 | 10/2003 | Ruigt | |
| 2003/0202264 | A1 | 10/2003 | Weber et al. | |
| 2003/0202265 | A1 | 10/2003 | Reboa et al. | |
| 2003/0202266 | A1 | 10/2003 | Ring et al. | |
| 2004/0008396 | A1 | 1/2004 | Stappaerts | |
| 2004/0021621 | A1 * | 2/2004 | Kim et al. | 345/60 |
| 2004/0021658 | A1 * | 2/2004 | Chen | 345/212 |
| 2004/0022044 | A1 | 2/2004 | Yasuoka et al. | |
| 2004/0027701 | A1 | 2/2004 | Ishikawa | |
| 2004/0036697 | A1 * | 2/2004 | Kim et al. | 345/617 |
| 2004/0051929 | A1 | 3/2004 | Sampsell et al. | |
| 2004/0058532 | A1 | 3/2004 | Miles et al. | |
| 2004/0080516 | A1 * | 4/2004 | Kurumisawa et al. | 345/596 |
| 2004/0080807 | A1 | 4/2004 | Chen et al. | |
| 2004/0136596 | A1 * | 7/2004 | Oneda et al. | 382/232 |
| 2004/0145049 | A1 | 7/2004 | McKinnell et al. | |
| 2004/0145553 | A1 | 7/2004 | Sala et al. | |
| 2004/0147056 | A1 | 7/2004 | McKinnell et al. | |
| 2004/0155872 | A1 | 8/2004 | Kamijo | |
| 2004/0160143 | A1 | 8/2004 | Shreeve et al. | |
| 2004/0174583 | A1 | 9/2004 | Chen et al. | |
| 2004/0179281 | A1 | 9/2004 | Reboa | |
| 2004/0183948 | A1 * | 9/2004 | Lai et al. | 348/581 |
| 2004/0212026 | A1 | 10/2004 | Van Brocklin et al. | |
| 2004/0217378 | A1 | 11/2004 | Martin et al. | |
| 2004/0217919 | A1 | 11/2004 | Pichl et al. | |
| 2004/0218251 | A1 | 11/2004 | Piehl et al. | |
| 2004/0218334 | A1 | 11/2004 | Martin et al. | |
| 2004/0218341 | A1 | 11/2004 | Martin et al. | |
| 2004/0223204 | A1 | 11/2004 | Mao et al. | |
| 2004/0227493 | A1 | 11/2004 | Van Brocklin et al. | |
| 2004/0240032 | A1 | 12/2004 | Miles | |
| 2004/0240138 | A1 | 12/2004 | Martin et al. | |
| 2004/0245588 | A1 | 12/2004 | Nikkel et al. | |
| 2004/0263944 | A1 | 12/2004 | Miles et al. | |
| 2005/0001797 | A1 * | 1/2005 | Miller et al. | 345/87 |
| 2005/0001828 | A1 | 1/2005 | Martin et al. | |
| 2005/0012577 | A1 | 1/2005 | Pillans et al. | |
| 2005/0024301 | A1 | 2/2005 | Funston | |
| 2005/0038950 | A1 | 2/2005 | Adelmann | |
| 2005/0057442 | A1 | 3/2005 | Way | |
| 2005/0068583 | A1 | 3/2005 | Gutkowski et al. | |
| 2005/0069209 | A1 | 3/2005 | Damera-Venkata et al. | |
| 2005/0089213 | A1 * | 4/2005 | Geng | 382/154 |
| 2005/0116924 | A1 | 6/2005 | Sauvante et al. | |
| 2005/0206991 | A1 | 9/2005 | Chui et al. | |
| 2005/0286113 | A1 | 12/2005 | Miles | |

| | | | | |
|---|---|---|---|---|
| 2005/0286114 | A1 | 12/2005 | Miles | |
| 2005/0286741 | A1* | 12/2005 | Watanabe et al. | 382/107 |
| 2006/0044246 | A1 | 3/2006 | Mignard | |
| 2006/0044298 | A1 | 3/2006 | Mignard et al. | |
| 2006/0044928 | A1 | 3/2006 | Chui et al. | |
| 2006/0056000 | A1 | 3/2006 | Mignard | |
| 2006/0057754 | A1 | 3/2006 | Cummings | |
| 2006/0066542 | A1 | 3/2006 | Chui | |
| 2006/0066559 | A1 | 3/2006 | Chui et al. | |
| 2006/0066560 | A1 | 3/2006 | Gally et al. | |
| 2006/0066561 | A1 | 3/2006 | Chui et al. | |
| 2006/0066594 | A1 | 3/2006 | Tyger | |
| 2006/0066597 | A1 | 3/2006 | Sampsell | |
| 2006/0066598 | A1 | 3/2006 | Floyd | |
| 2006/0066601 | A1 | 3/2006 | Kothari | |
| 2006/0066935 | A1 | 3/2006 | Cummings et al. | |
| 2006/0066937 | A1 | 3/2006 | Chui | |
| 2006/0066938 | A1 | 3/2006 | Chui | |
| 2006/0067648 | A1 | 3/2006 | Chui et al. | |
| 2006/0067653 | A1 | 3/2006 | Gally et al. | |
| 2006/0077127 | A1 | 4/2006 | Sampsell et al. | |
| 2006/0077505 | A1 | 4/2006 | Chui et al. | |
| 2006/0077520 | A1 | 4/2006 | Chui et al. | |
| 2006/0101293 | A1* | 5/2006 | Chandley et al. | 713/300 |
| 2006/0103613 | A1 | 5/2006 | Chui | |
| 2006/0119613 | A1* | 6/2006 | Kerofsky | 345/590 |
| 2006/0250335 | A1 | 11/2006 | Stewart et al. | |
| 2006/0250350 | A1 | 11/2006 | Kothari et al. | |
| 2006/0267923 | A1* | 11/2006 | Kerofsky | 345/102 |
| 2007/0126673 | A1 | 6/2007 | Djordjev et al. | |
| 2007/0280357 | A1* | 12/2007 | Sung | 375/240.25 |
| 2008/0037867 | A1* | 2/2008 | Lee et al. | 382/168 |
| 2008/0062289 | A1* | 3/2008 | Sudo | 348/241 |
| 2008/0069469 | A1* | 3/2008 | Yan et al. | 382/261 |
| 2008/0094495 | A1* | 4/2008 | Shikata et al. | 348/314 |
| 2008/0204475 | A1* | 8/2008 | Kim et al. | 345/660 |
| 2008/0212884 | A1* | 9/2008 | Oneda et al. | 382/232 |
| 2008/0238837 | A1* | 10/2008 | Yamaguchi | 345/77 |
| 2008/0252628 | A1* | 10/2008 | Han et al. | 345/207 |
| 2008/0291153 | A1* | 11/2008 | Zhang et al. | 345/102 |
| 2009/0219309 | A1 | 9/2009 | Sampsell | |
| 2009/0219600 | A1 | 9/2009 | Gally et al. | |
| 2009/0225069 | A1 | 9/2009 | Sampsell | |
| 2009/0273596 | A1 | 11/2009 | Cummings | |
| 2010/0026680 | A1 | 2/2010 | Chui et al. | |
| 2010/0053224 | A1* | 3/2010 | Hashimoto et al. | 345/690 |
| 2010/0091029 | A1* | 4/2010 | Han et al. | 345/589 |
| 2010/0315398 | A1 | 12/2010 | Chui et al. | |
| 2011/0134159 | A1* | 6/2011 | Adachi | 345/690 |

FOREIGN PATENT DOCUMENTS

| | | | |
|---|---|---|---|
| EP | 0306308 | A2 | 3/1989 |
| EP | 0318050 | A | 5/1989 |
| EP | 0 417 523 | A | 3/1991 |
| EP | 0 484 969 | A2 | 11/1991 |
| EP | 0 467 048 | A | 1/1992 |
| EP | 0570906 | A | 11/1993 |
| EP | 0608056 | A1 | 7/1994 |
| EP | 0655725 | A1 | 5/1995 |
| EP | 0 667 548 | A1 | 8/1995 |
| EP | 0 706 164 | | 4/1996 |
| EP | 0725380 | A1 | 8/1996 |
| EP | 0852371 | A1 | 7/1998 |
| EP | 0911794 | A1 | 4/1999 |
| EP | 0 017 038 | A | 7/2000 |
| EP | 1 134 721 | | 9/2001 |
| EP | 1 146 533 | A | 10/2001 |
| EP | 1 239 448 | | 9/2002 |
| EP | 1 280 129 | | 1/2003 |
| EP | 1343190 | A | 9/2003 |
| EP | 1345197 | A | 9/2003 |
| EP | 1381023 | A | 1/2004 |
| EP | 1 414 011 | | 4/2004 |
| EP | 1473691 | A2 | 11/2004 |
| GB | 2401200 | A | 11/2004 |
| JP | 2000-075963 | | 4/2000 |
| JP | 2004-29571 | | 1/2004 |
| WO | WO 95/30924 | | 11/1995 |
| WO | WO 97/17628 | | 5/1997 |
| WO | WO 99/52006 | A3 | 10/1999 |
| WO | WO 01/73937 | A | 10/2001 |
| WO | WO 02/089103 | | 11/2002 |
| WO | WO 03/007049 | A1 | 1/2003 |
| WO | WO 03/015071 | A2 | 2/2003 |
| WO | WO 03/044765 | A2 | 5/2003 |
| WO | WO 03/060940 | A | 7/2003 |
| WO | WO 03/069413 | A1 | 8/2003 |
| WO | WO 03/073151 | A1 | 9/2003 |
| WO | WO 03/079323 | A | 9/2003 |
| WO | WO 03/090199 | A1 | 10/2003 |
| WO | WO 2004/006003 | A1 | 1/2004 |
| WO | WO 2004/026757 | A2 | 4/2004 |
| WO | WO 2004/049034 | A1 | 6/2004 |
| WO | WO 2004/054088 | | 6/2004 |

OTHER PUBLICATIONS

Bains, "Digital Paper Display Technology holds Promise for Portables", CommsDesign EE Times (2000).

Lieberman, "MEMS Display Looks to give PDAs Sharper Image" EE Times (2004).

Lieberman, "Microbridges at heart of new MEMS displays" EE Times (2004).

Seeger et al., "Stabilization of Electrostatically Actuated Mechanical Devices", (1997) International Conference on Solid State Sensors and Actuators; vol. 2, pp. 1133-1136.

Peroulis et al., Low contact resistance series MEMS switches, 2002, pp. 223-226, vol. 1, IEEE MTT-S International Microwave Symposium Digest, New York, NY.

ISR and WO for PCT/US06/046723 filed Dec. 7, 2006.

Miles et al., 5.3: Digital Paper™: Reflective displays using interferometric modulation, SID Digest, vol. XXXI, 2000 pp. 32-35.

IPRP for PCT/US06/046723 filed Dec. 7, 2006.

Chen et al., Low peak current driving scheme for passive matrix-OLED, SID International Symposium Digest of Technical Papers, May 2003, pp. 504-507.

Miles, MEMS-based interferometric modulator for display applications, Part of the SPIE Conference on Micromachined Devices and Components, vol. 3876, pp. 20-28 (1999).

* cited by examiner

| | | Column Output Signals | |
|---|---|---|---|
| | | $+V_{bias}$ | $-V_{bias}$ |
| Row Output Signals | 0 | Stable | Stable |
| | $+\Delta V$ | Relax | Actuate |
| | $-\Delta V$ | Actuate | Relax |

| | | |
|---|---|---|
| w(-1,-1) | w(-1,0) | w(-1,1) |
| w(0,-1) | w(0,0) | w(0,1) |
| w(1,-1) | w(1,0) | w(1,1) |

FIG. 9A $\frac{1}{9}$ x

| | | |
|---|---|---|
| 1 | 1 | 1 |
| 1 | 1 | 1 |
| 1 | 1 | 1 |

FIG. 9B $\frac{1}{16}$ x

| | | |
|---|---|---|
| 1 | 2 | 1 |
| 2 | 4 | 2 |
| 1 | 2 | 1 |

FIG. 9C $\frac{1}{3}$ x

| | | |
|---|---|---|
| 0 | 1 | 0 |
| 0 | 1 | 0 |
| 0 | 1 | 0 |

FIG. 9D $\frac{1}{3}$ x

| | | |
|---|---|---|
| 0 | 0 | 0 |
| 1 | 1 | 1 |
| 0 | 0 | 0 |

FIG. 9E $\frac{1}{3}$ x

| | | |
|---|---|---|
| 0 | 0 | 1 |
| 0 | 1 | 0 |
| 1 | 0 | 0 |

FIG. 9F $\frac{1}{9} x$

| | | | | |
|---|---|---|---|---|
| 0 | 1 | 1 | 1 | 0 |
| 0 | 0 | 1 | 0 | 0 |
| 0 | 0 | 1 | 0 | 0 |
| 0 | 0 | 1 | 0 | 0 |
| 0 | 1 | 1 | 1 | 0 |

| | | | |
|---|---|---|---|
| $TC_{0,0}$ | $TC_{0,1}$ | $TC_{0,2}$ | $TC_{0,3}$ |
| $TC_{1,0}$ | $TC_{1,1}$ | $TC_{1,2}$ | $TC_{1,3}$ |
| $TC_{2,0}$ | $TC_{2,1}$ | $TC_{2,2}$ | $TC_{2,3}$ |
| $TC_{3,0}$ | $TC_{3,1}$ | $TC_{3,2}$ | $TC_{3,3}$ |

SYSTEM AND METHOD FOR POWER REDUCTION WHEN DECOMPRESSING VIDEO STREAMS FOR INTERFEROMETRIC MODULATOR DISPLAYS

BACKGROUND OF THE INVENTION

1. Field of the Invention

The field of the invention relates to microelectromechanical systems (MEMS).

2. Description of the Related Art

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal, e.g., a voltage. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF THE INVENTION

An embodiment provides for a method for processing image data to be displayed on a display device where the display device requires more power to be driven to display image data comprising particular spatial frequencies in one dimension than to be driven to display image data comprising the particular spatial frequencies in a second dimension. The method includes receiving image data, and filtering the received image data such that the image data at particular spatial frequencies in a first dimension are attenuated more than the image data at particular spatial frequencies in a second dimension.

Another embodiment provides for an apparatus for displaying image data that includes a display device, where the display device requires more power to be driven to display image data comprising particular spatial frequencies in a first dimension than to be driven to display image data comprising the particular spatial frequencies in a second dimension. The apparatus further includes a processor configured to receive image data and to filter the image data, the filtering being such that the image data at particular spatial frequencies in the first dimension are attenuated more than the image data at particular spatial frequencies in the second dimension. The apparatus further includes at least one driver circuit configured to communicate with the processor and to drive the display device, the driver circuit further configured to provide the filtered image data to the display device.

Another embodiment provides for an apparatus for displaying video data that includes at least one driver circuit, and a display device configured to be driven by the driver circuit, where the display device requires more power to be driven to display video data comprising particular spatial frequencies in a first dimension, than to be driven to display video data comprising the particular spatial frequencies in a second dimension. The apparatus further includes a processor configured to communicate with the driver circuit, the processor further configured to receive partially decoded video data, wherein the partially decoded video data comprises coefficients in a transformed domain, the processor further configured to filter the partially decoded video data, wherein the filtering comprises reducing a magnitude of at least one of the transformed domain coefficients containing spatial frequencies within the particular spatial frequencies in the first dimension. The processor is further configured to inverse transform the filtered partially decoded video data, thereby resulting in filtered spatial domain video data, and to finish decoding the filtered spatial domain video data. The driver circuit is configured to provide the decoded spatial domain video data to the display device.

FIG. *9a* is a general 3×3 spatial filter mask.

FIG. *9b* is a 3×3 spatial filter mask providing a symmetrical averaging (smoothing).

FIG. *9c* is a 3×3 spatial filter mask providing a symmetrical weighted averaging (smoothing).

FIG. *9d* is a 3×3 spatial filter mask providing averaging (smoothing) in the vertical dimension only.

FIG. 9$e$ is a 3×3 spatial filter mask providing averaging (smoothing) in the horizontal dimension only.

FIG. 9$f$ is a 3×3 spatial filter mask providing averaging (smoothing) in one diagonal dimension only.

FIG. 9$g$ is a 5×5 spatial filter mask providing averaging (smoothing) in both vertical and horizontal dimensions, but with more smoothing in the vertical dimension than in the horizontal dimension.

FIG. 10$a$ illustrates basis images of an exemplary 4×4 image transform.

FIG. 10$b$ shows transform coefficients used as multipliers of the basis images shown in FIG. 10$a$.

Figure 11:
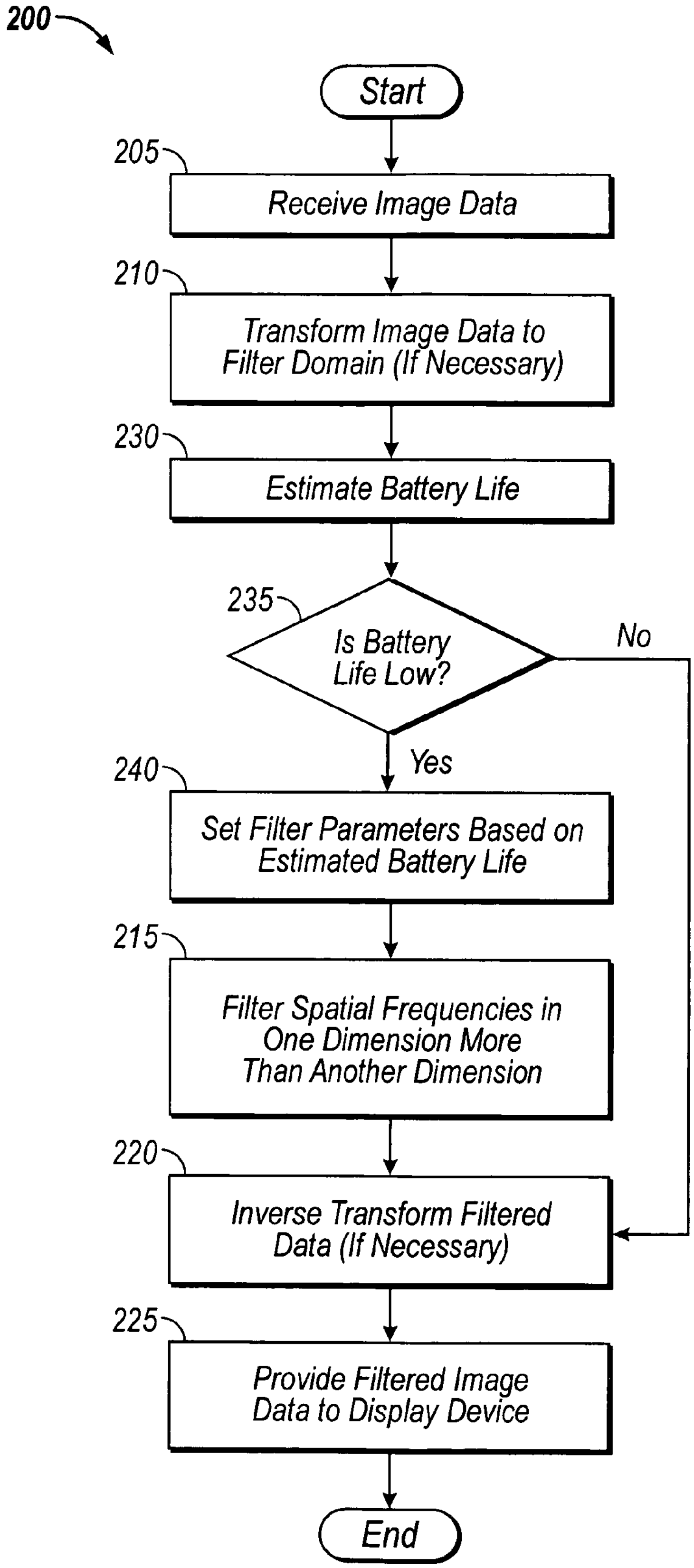

FIG. 11 is a flowchart illustrating an embodiment of a process for performing selective spatial frequency filtering of image data to be displayed on a display device.

Figure 12:
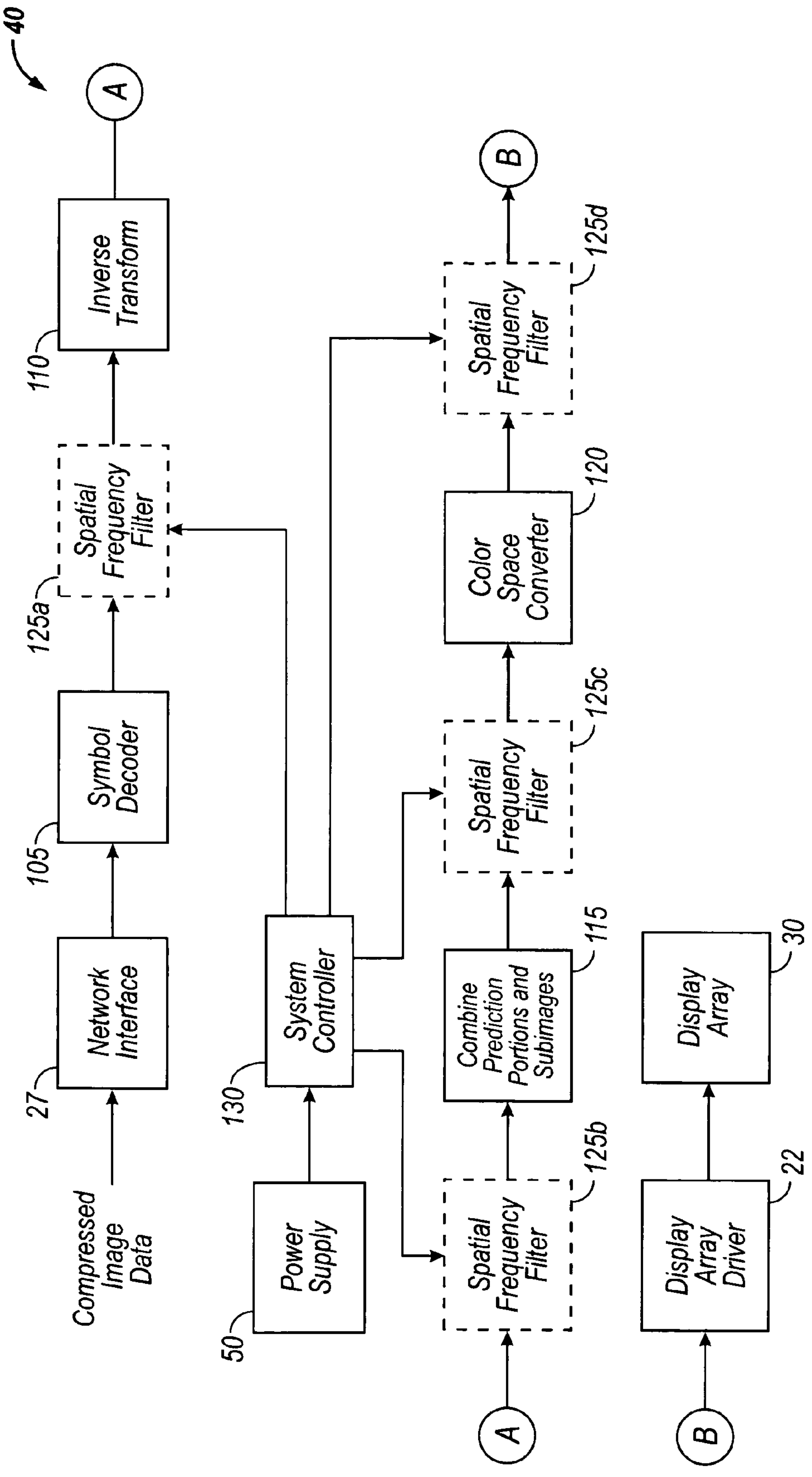

FIG. 12 is a system block diagram illustrating an embodiment of a visual display device for decoding compressed video/image data and performing selective spatial frequency filtering of the video/image data.

Figure 13:
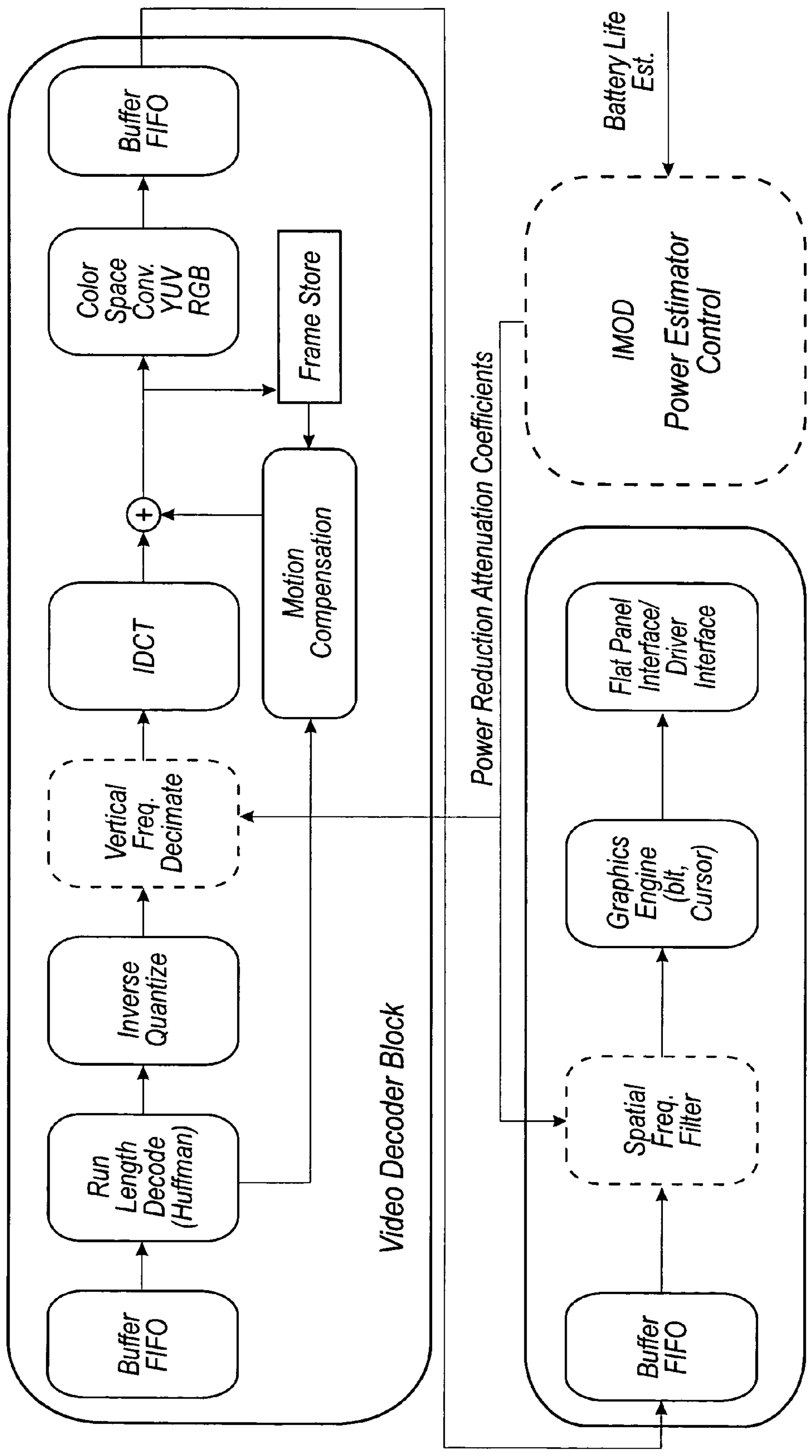

FIG. 13 is a system block diagram illustrating another embodiment of a visual display device for decoding compressed video/image data and performing selective spatial frequency filtering of the video/image data.

DETAILED DESCRIPTION OF THE PREFERRED EMBODIMENT

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Bistable displays, such as an array of interferometric modulators, may be configured to be driven to display images utilizing several different types of driving protocols. These driving protocols may be designed to take advantage of the bistable nature of the display to conserve battery power. The driving protocols, in many instances, may update the display in a structured manner, such as row-by-row, column-by-column or in other fashions. These driving protocols, in many instances, require switching of voltages in the rows or columns many times a second in order to update the display. Since the power to update a display is dependent of the frequency of the charging and discharging of the column or row capacitance, the power usage is highly dependent on the image content. Images characterized by high spatial frequencies typically require more power to display. This dependence on spatial frequencies, in many instances, is not equal in all dimensions. A method and apparatus for performing spatial frequency filtering at particular frequencies and in a selected dimension(s) more than another dimension(s), so as to reduce the power required to display an image, is discussed.

Figure 1:
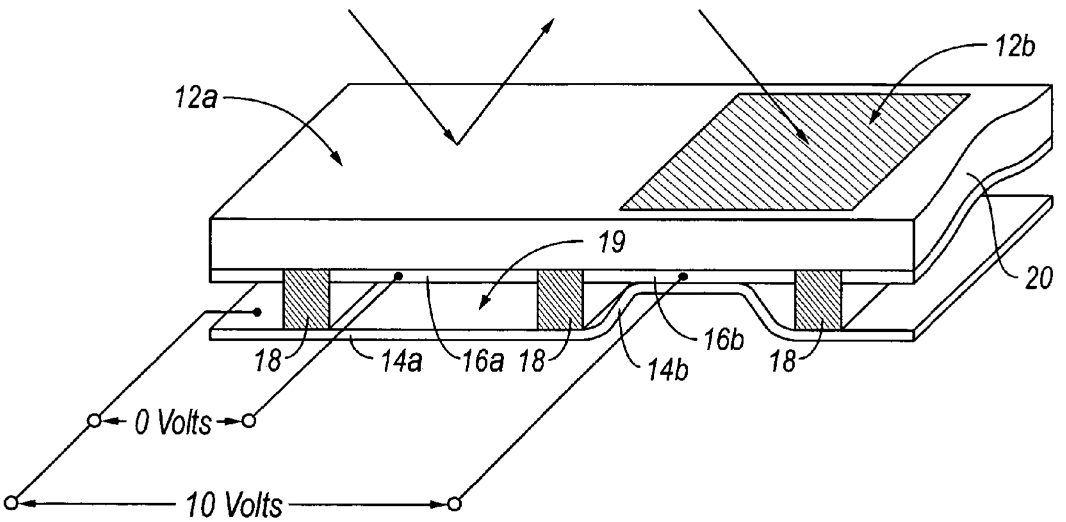
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12$a$ and 12$b$. In the interferometric modulator 12$a$ on the left, a movable reflective layer 14$a$ is illustrated in a relaxed position at a predetermined distance from an optical stack 16$a$, which includes a partially reflective layer. In the interferometric modulator 12$b$ on the right, the movable reflective layer 14$b$ is illustrated in an actuated position adjacent to the optical stack 16$b$.

The optical stacks 16$a$ and 16$b$ (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack are patterned into parallel strips, and may form row electrodes in a display device as described further below. The movable reflective layers 14$a$, 14$b$ may be formed as a series of parallel strips of a deposited metal layer or layers (orthogonal to the row electrodes of 16$a$, 16$b$) deposited on top of posts 18 and an intervening sacrificial material deposited between the posts 18. When the sacrificial material is etched away, the movable reflective layers 14$a$, 14$b$ are separated from the optical stacks 16$a$, 16$b$ by a defined gap 19. A highly conductive and reflective material such as aluminum may be used for the reflective layers 14, and these strips may form column electrodes in a display device.

With no applied voltage, the cavity 19 remains between the movable reflective layer 14*a* and optical stack 16*a*, with the movable reflective layer 14*a* in a mechanically relaxed state, as illustrated by the pixel 12*a* in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12*b* on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
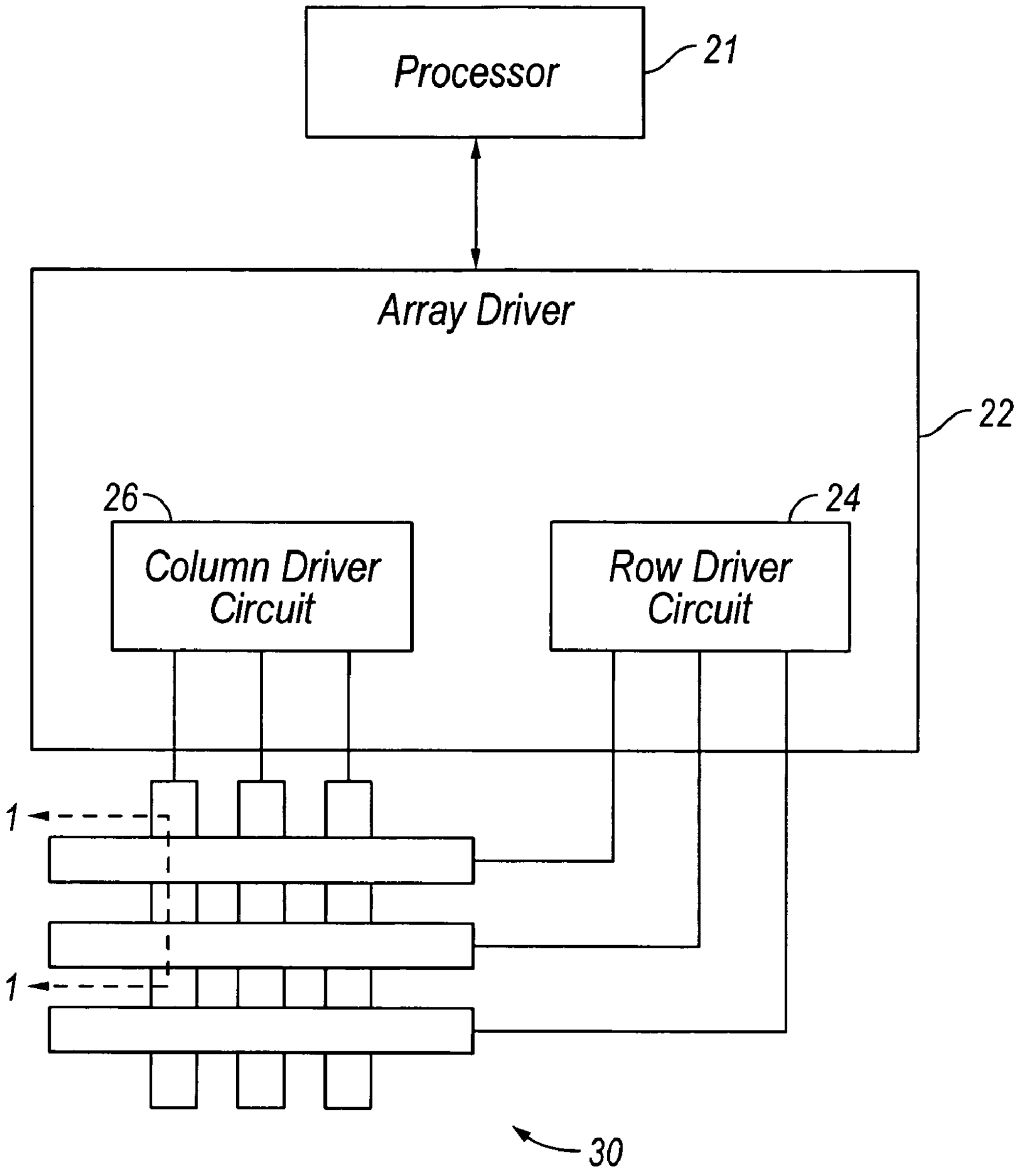
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV200, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
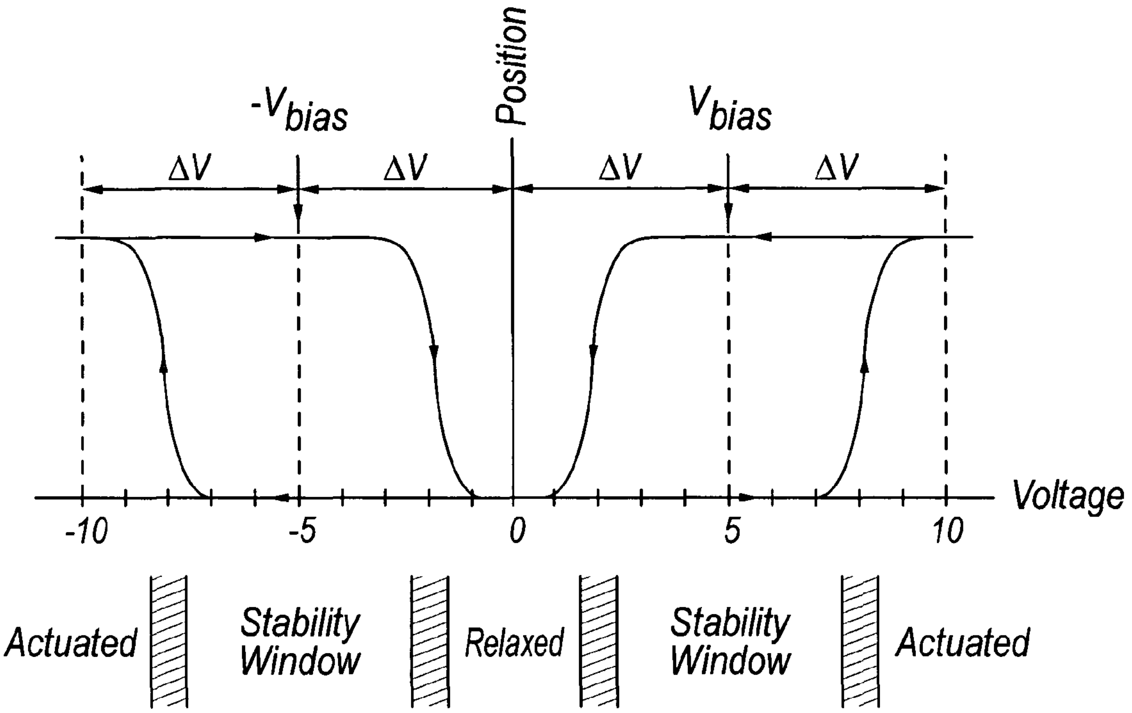
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
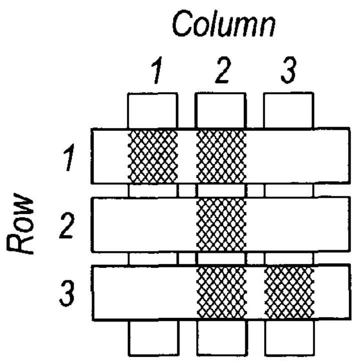
FIGS. 5A and 5B illustrate one exemplary timing diagram for row and column signals that may be used to write a frame of display data to the 3×3 interferometric modulator display of FIG. 2.
Figure 5B:
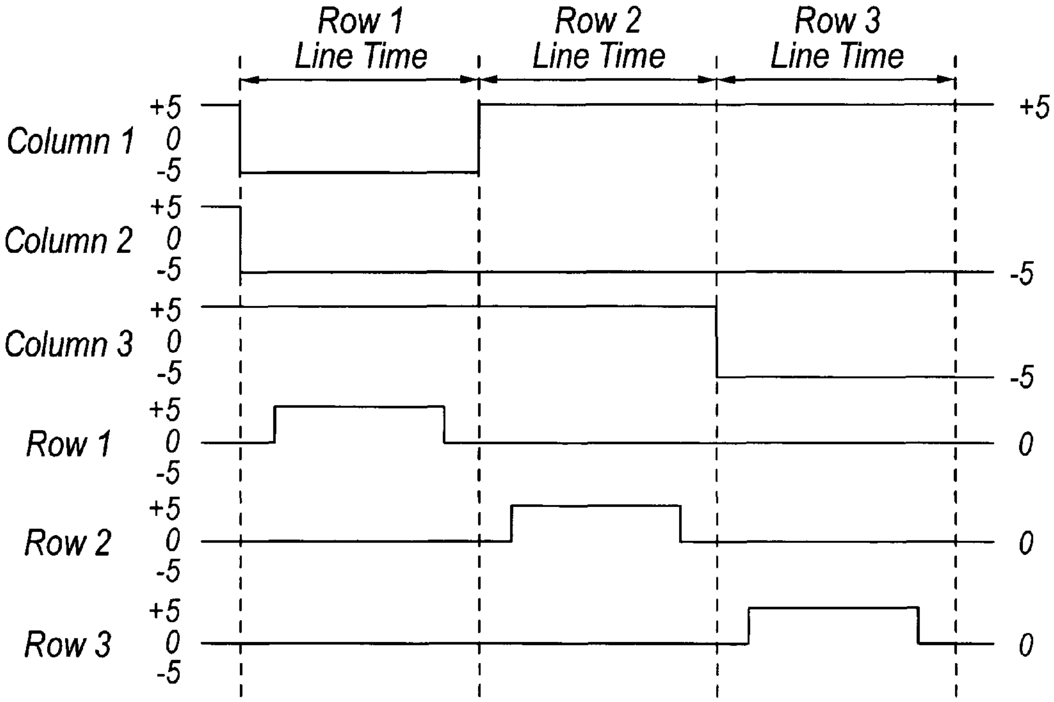

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
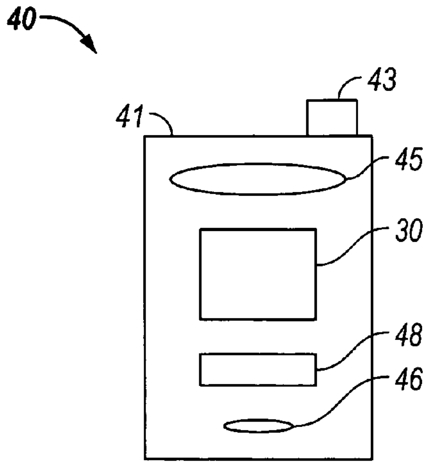
FIGS. 6A and 6B are system block diagrams illustrating an embodiment of a visual display device comprising a plurality of interferometric modulators.
Figure 6B:
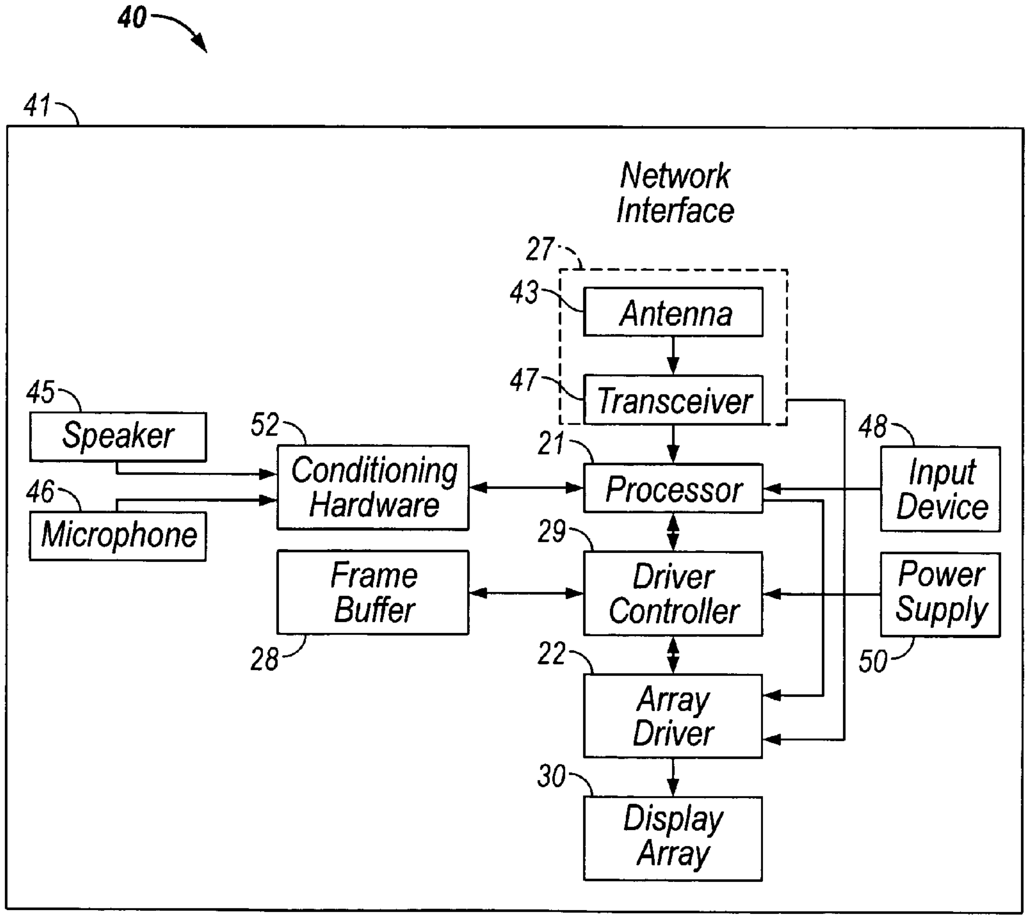

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
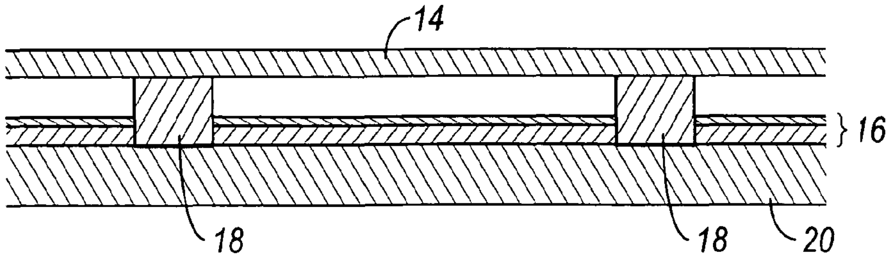
FIG. 7A is a cross section of the device of FIG. 1.
Figure 7B:
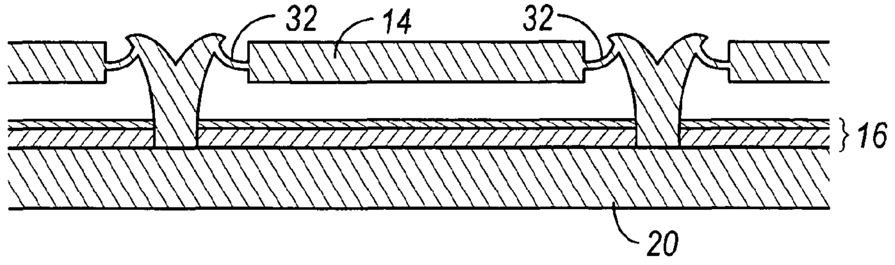
FIG. 7B is a cross section of an alternative embodiment of an interferometric modulator.
Figure 7C:
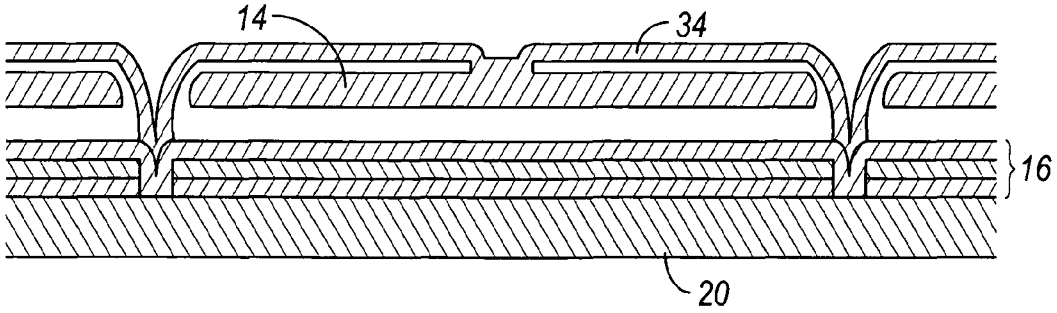
FIG. 7C is a cross section of another alternative embodiment of an interferometric modulator.
Figure 7D:
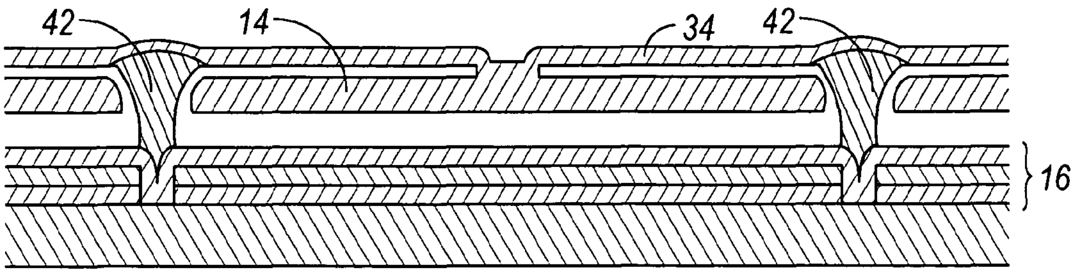
FIG. 7D is a cross section of yet another alternative embodiment of an interferometric modulator.
Figure 7E:
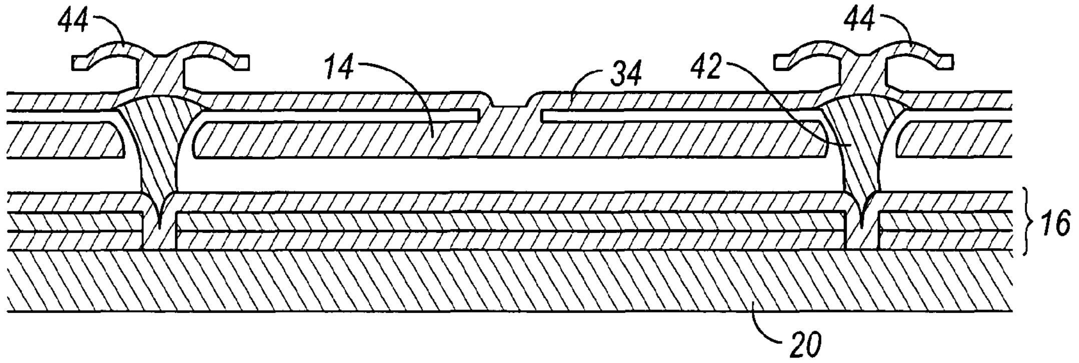
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Figure 8:
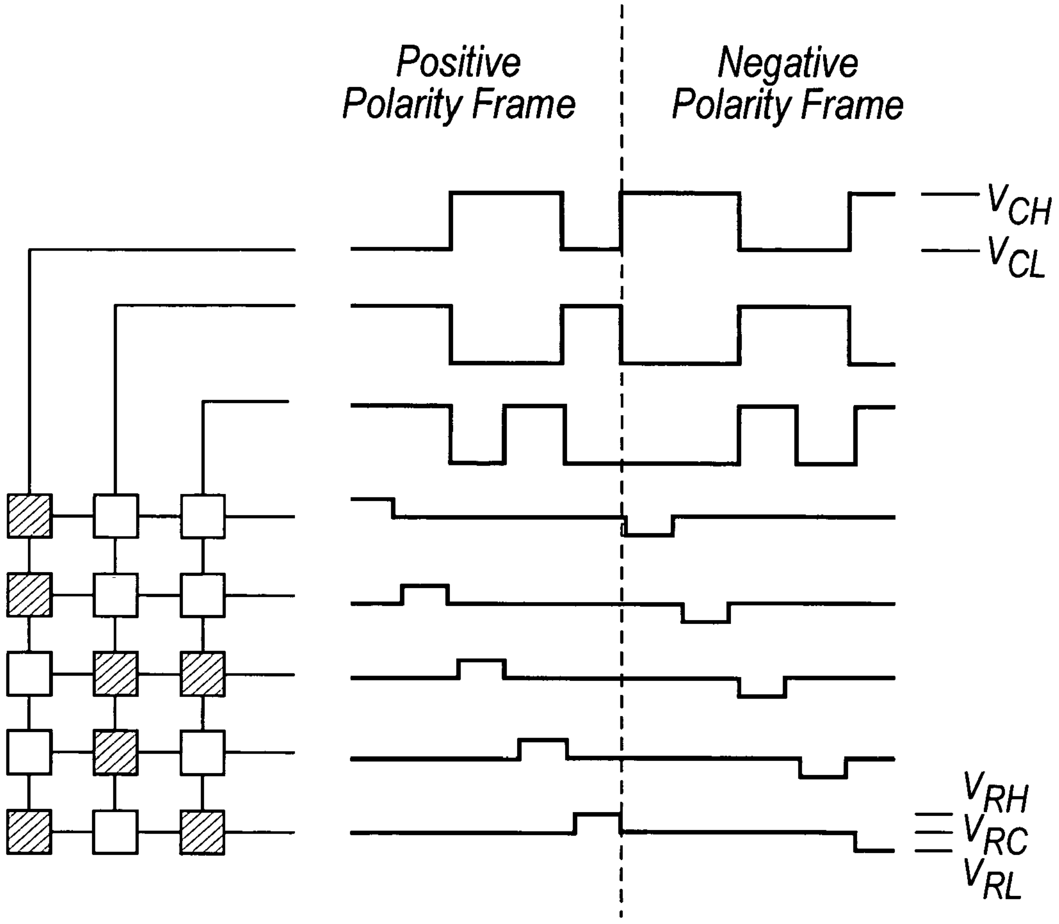
FIG. 8 illustrates one exemplary timing diagram for row and column signals that may be used to write a frame of display data to a 5 row by 3 column interferometric modulator display.

FIG. 8 illustrates one exemplary timing diagram for row and column signals that may be used to write a frame of display data to a 5 row by 3 column interferometric modulator display. In the embodiment shown in FIG. 8, the columns are driven by a segment driver, whereas the rows are driven by a common driver. Segment drivers, as they are known in the art, provide the high transition frequency image data signals to the display, which may change up to n−1 times per frame for a display with n rows. Common drivers, on the other hand, are characterized by relatively low frequency pulses that are applied once per row per frame and are independent of the image data. Herein, when a display is said to be driven on a row-by-row basis, this refers to the rows being driven by a low frequency common driver and the columns being driven with image data by a high frequency segment driver. When a display is said to be driven on a column-by-column basis, this refers to the columns being driven by a low frequency common driver and the rows being driven with image data by a high frequency segment driver. The terms column and row should not be limited to mean vertical and horizontal, respectively. These terms are not meant to have any geometrically limiting meaning.

The actuation protocol shown in FIG. 8 is the same as was discussed above in reference to FIGS. 4 and 5. In FIG. 8, the column voltages are set at a high value $V_{CH}$ or a low value $V_{CL}$. The row pulses may be a positive polarity of $V_{RH}$ or a negative polarity of $V_{RL}$ with a center polarity $V_{RC}$ which may be zero. Column voltages are reversed when comparing the positive polarity frame (where row pulses are positive) signals to the negative polarity frame signals (where row pulses are negative). Power required for driving an interferometric modulator display is highly dependent on the data being displayed (as well as the current capacitance of the display). A major factor determining the power consumed by driving an interferometric modulator display is the charging and discharging the line capacitance for the columns receiving the image data. This is due to the fact that the column voltages are switched at a very high frequency (up to the number of rows in the array minus one for each frame update period), compared to the relatively low frequency of the row pulses (one pulse per frame update period). In fact, the power consumed by the row pulses generated by row driver circuit 24 may be ignored when estimating the power consumed in driving a display and still have an accurate estimate of total power consumed. The basic equation for estimating the energy consumed by writing to an entire column, ignoring row pulse energy, is:

$$(\text{Energy/col})=\tfrac{1}{2}*\text{count}*C_{line}*Vs^2 \quad (1)$$

The power consumed in driving an entire array is simply the energy required for writing to every column divided by time or:

$$\text{Power}=(\text{Energy/col})*n\text{cols}*f \quad (2)$$

where:

col=1 column ncols=number of columns in a display (e.g., 160)

count=number of transitions from $+V_{CH}$ to $+V_{CL}$ (and vice versa) required on a given column to display data for all rows Vs=column switching voltage $+/-(V_{CH}-V_{CL})$ $C_{line}$=capacitance of a column line f=the frame update frequency (Hz)

For a given frame update frequency (f) and frame size (number of columns), the power required to write to the display is linearly dependent on the frequency of the data being written. Of particular interest is the "count" variable in (1), which depends on the frequency of changes in pixel states (actuated or relaxed) in a given column. For this reason, images that contain high spatial frequencies in the vertical direction (parallel to the columns) are particularly demanding in terms of power consumption. High horizontal spatial frequencies do not drive up the power consumption since the row lines are not switched as quickly, thus the row capacitance is not charged and discharged as often. For example, with reference to FIG. 8, the right most (third) column will require more energy and power, than either of the other two columns, to write to the display. This is due to the necessary three switches of column voltage to write the third column compared to only two switches of voltage in the other two columns (Note, this assumes that the line capacitance of the three columns is close to the same).

This high sensitivity to vertical frequencies, particularly in the higher frequency ranges, and low sensitivity to horizontal frequencies in the same particular high range, is due to the actuation protocol updating in a row-by-row fashion. In another embodiment, where a display is updated column-by-column, the power consumption will be oppositely affected. Since the row lines will be switched frequently due to high spatial frequencies in the horizontal dimension, the power use will be highly sensitive to these horizontal frequencies and will be relatively insensitive to the spatial frequencies in the vertical dimension. One of skill in the art can easily imagine other embodiments of actuation protocols (such as updating diagonal lines of pixels) and/or display circuitry where the power consumption of a display is more sensitive (in terms of power needed to drive a display) to particular spatial frequencies in one dimension than in another dimension.

The unsymmetrical power sensitivity described above allows for unconventional filtering of image data that takes advantage of the power requirements exhibited by a display device such as an array of interferometric modulators. Since power use is more sensitive in one dimension (vertical in the embodiment discussed above) than another dimension (horizontal in the embodiment discussed above), image data may be filtered in the dimension that is most power sensitive and the other dimension may remain substantially unfiltered, thereby retaining more image fidelity in the other dimension. Thus, power use will be reduced due to the less frequent switching required to display the filtered dimension that is most power sensitive. The nature of the filtering, in one embodiment, is that of smoothing, low-pass filtering, and/or averaging (referred to herein simply as low-pass filtering) in one dimension more than another dimension. This type of filtering, in general, allows low frequencies to remain and attenuates image data at higher frequencies. This will result in pixels in close spatial proximity to each other in the filtered dimension having a higher likelihood of being in identical states, thus requiring less power to display.

Pixel values may be in several models including gray level (or intensity) varying from black to grey to white (this may be all that is needed to represent monochrome or achromatic light), and radiance and brightness for chromatic light. Other color models that may be used include the RGB (Red, Green, Blue) or primary colors model, the CMY (Cyan, Magenta, Yellow) or secondary colors model, the HSI (Hue, Saturation, Intensity) model, and the Luminance/Chrominance model (Y/Cr/Cb: Luminance, red chrominance, blue chrominance). Any of these models can be used to represent the spatial pixels to be filtered. In addition to the spatial pixels, image data may be in a transformed domain where the pixel values have been transformed. Transforms that may be used for images include the DCT (Discrete Cosine Transform), the DFT (Discrete Fourier Transform), the Hadamard (or Walsh-Hadamard) transform, discrete wavelet transforms, the DST (discrete sine transform), the Haar transform, the slant transform, the KL (Karhunen-Loeve) transform and integer transforms such as that used in H.264 video compression. Filtering may take place in either the spatial domain or one of the transformed domains. Spatial domain filtering will now be discussed.

Spatial domain filtering utilizes pixel values of neighboring image pixels to calculate the filtered value of each pixel in the image space. FIG. 9*a* shows a general 3×3 spatial filter mask that may be used for spatial filtering. Other sized masks may be used, as the 3×3 mask is only exemplary. The mechanics of filtering include moving the nine filter coefficients w(i,j) where i=−1, 0, 1, and j=−1, 0, 1 from pixel to pixel in the image. Specifically, the center coefficient w(0,0) is positioned over the pixel value f(x,y) that is being filtered and the other 8 coefficients lie over the neighboring pixel values. The pixel values may be any one of the above mentioned achromatic or chromatic light variables. For linear filtering utilizing the 3×3 mask of FIG. 9*a*, the filtered pixel result (or response) value "R" of a pixel value f(x,y) is given by:

$$R=w(-1,-1)f(x-1,y-1)+w(-1,0)f(x-1,y)+\ldots+w(0,0)f(x,y)+\ldots w(1,0)f(x+1,y)+w(1,1)f(x+1,y+1), \quad (3)$$

Equation 3 is the sum of the products of the mask coefficients and the corresponding pixel values underlying the mask of FIG. 9*a*. The filter coefficients may be picked to perform simple low-pass filter averaging in all dimensions by setting them all to one as shown in FIG. 9*b*. The scalar multiplier 1/9 keeps the filtered pixel values in the same range as the raw (unfiltered) image values. FIG. 9*c* shows filter coefficients for calculating a weighted average where the different pixels have larger or smaller effects on the response "R". The symmetrical masks shown in FIGS. 9*b* and 9*c* will result in the same filtering in both the vertical and horizontal dimensions. This type of symmetrical filtering, while offering power savings by filtering in all directions, unnecessarily filters in dimensions that do not have an appreciable affect on the display power reduction.

FIG. 9*d*, shows a 3×3 mask that low-pass filters in the vertical dimension only. This mask, of course, could be reduced to a single column vector, but is shown as a 3×3 mask for illustrative purposes only. The filtered response in this case will be the average of the pixel value being filtered, f(x,y), and the pixel values immediately above, f(x−1,y) and below, f(x+1,y). This will result in low-pass filtering, or smoothing, of vertical spatial frequencies only. By only filtering the vertical frequencies, the power required to display the filtered image data may be lower in this embodiment. By not filtering the other dimensions, image details such as vertical edges and/or lines may be retained. FIG. 9*e*, shows a 3×3 mask that low-pass filters in the horizontal dimension only. This mask, of course, could be reduced to a single row vector but is shown as a 3×3 mask for illustrative purposes only. The filtered response in this case will be the average of the pixel value being filtered, f(x,y), and the pixel values immediately to the right, f(x,y+1) and to the left, f(x,y−1). This filter may reduce the power required to display image data in an array of interferometric modulators that are updated in a column-by-column fashion. FIG. 9*f*, shows a 3×3 mask that low-pass filters in a diagonal dimension only. The filtered response in this case will be the average of the pixel value being filtered, f(x,y), and the pixel values immediately above and to the right, f(x−1,y+1) and below and to the left, f(x+1,y−1). This filter would reduce the spatial frequencies along the diagonal where the ones are located, but would not filter frequencies along the orthogonal diagonal.

The filter masks shown in FIGS. 9*a* through 9*f* could be expanded to cover more underlying pixels such as a 5×5 mask, or a 5×1 row vector or column vector mask. The affect of averaging more neighboring pixel values together will result in more attenuation of even lower spatial frequencies, which may result in even more power savings. In addition to changing the size of the masks, the coefficient values w(ij) may also be adjusted to unequal values to perform weighted averaging as was discussed above in reference to FIG. 9*c*. In addition, the filter masks could be used in conjunction with nonlinear filtering techniques. As in the linear filtering discussed above, nonlinear filtering performs calculations on neighboring pixels underlying the filter coefficients of the mask. However, instead of performing simple multiplication and addition functions, nonlinear filtering may include operations that are conditional on the values of the pixel variables in the neighborhood of the pixel being filtered. One example of nonlinear filtering is median filtering. For a 3×1 row vector or column vector mask as depicted in FIGS. 9*d* and 9*e*, respectively, the output response, utilizing a median filtering operation, would be equal to the middle value of the three underlying pixel values. Other non-linear filtering techniques, known by those of skill in the art, may also be applicable to filtering image data, depending on the embodiment.

Figures 9G, 10A, 10B:
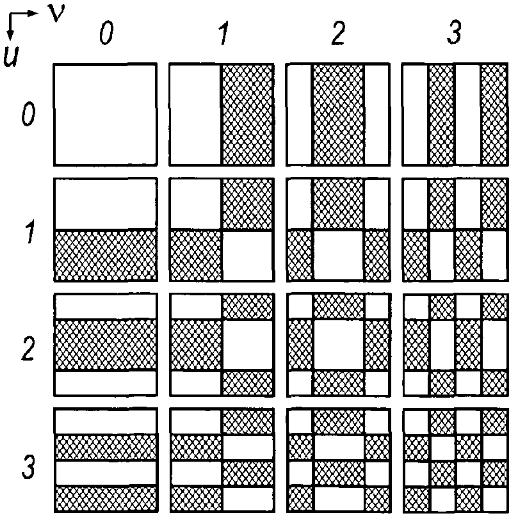

In one embodiment, a spatial filter may filter in more than one dimension and still reduce the power required to display an image. FIG. 9*g* shows an embodiment of a 5×5 filter mask that filters predominantly in the vertical direction. In a linear filtering mode, the filter mask averages nine pixel values, five of which lie on the vertical line of the pixel being filtered and four of which lie one pixel off of the vertical at the most vertical locations (i.e., f(x−2,y−1), f(x−2,y+1), f(x+2,y−1) and f(x+2,y+1)) covered by the mask. The resulting filtering will predominantly attenuate vertical frequencies and some off-vertical frequencies. This type of filtering may be useful for reducing the power in a display device which is sensitive to those spatial frequencies in the vertical and off-vertical ranges that are filtered by the mask. The other spatial frequencies will be mostly unaffected and retain accuracy in the other dimensions. Other filters, not depicted in FIG. 9, that smooth predominantly in one dimension than another will be apparent to those of skill in the art.

The pixel values being filtered (either spatially as discussed above or in a transform domain as discussed below) may include any one of several variables including, but not limited to, intensity or gray level, radiance, brightness, RGB or primary color coefficients, CMY or secondary color coefficients, HSI coefficients, and the Luminance/Chrominance coefficients (i.e., Y/Cr/Cb: Luminance, red chrominance, and blue chrominance, respectively). Some color variables may be better candidates for filtering than others. For example, the human eye is typically less sensitive to chrominance color data comprised mainly of reds and blues, than it is to Luminance data comprised of green-yellow colors. For this reason, the red and blue or chrominance values may be more heavily filtered than the green-yellow or luminance values without affecting the human visual perception as greatly.

Filtering on the borders of images, where the filter mask coefficients do not lie over pixels, may require special treatment. Well known methods such as padding with zeros, padding with ones, padding with some other pixel value other than zero or 1 may be used when filtering along image borders. Pixels that lie outside the mask may be ignored and not included in the filtering. The filtered image may be reduced in size by only filtering pixels that have neighboring pixels to completely fill the mask.

In addition to the spatial domain filtering, another general form of filtering is done in one of several transform domains. One of the most common and well known transform domains is the frequency domain which results from performing transforms such as the Fourier Transform, the DFT, the DCT or the DST. Other transforms, such as the Hadamard (or Walsh-Hadamard) transform, the Haar transform, the slant transform, the KL transform and integer transforms such as that used in H.264 video compression, while not truly frequency domain transforms, do contain frequency characteristics within the transform basis images. The act of transforming pixel data from the spatial domain to a transform domain replaces the spatial pixel values with transform coefficients that are multipliers of basis images. FIG. 10*b* shows basis images of an exemplary 4×4 image transform. FIG. 10*b* illustrates transform coefficients used as multipliers of the basis images. The coefficient $TC_{0,0}$ for example is the coefficient multiplier of the DC (frequency centered at zero) basis image (u,v=0,0 in FIG. 10*a*). As can be seen from observing the basis images, some of the basis images contain only horizontal patterns, some contain only vertical patterns and others contain patterns containing both vertical and horizontal patterns. Basis images containing all horizontal patterns (e.g., basis images where (u,v)=[(1,0); (2,0); (3,0)]) or mostly horizontal patterns (e.g., basis image (u,v)=(3,1)) correspond to all or mostly vertical spatial frequencies. In contrast, basis images containing all vertical patterns (e.g., basis images where (u,v)=[(0,1); (0,2); (0,3)]) or mostly vertical patterns (e.g., basis image (u,v)=(1,3)) correspond to all or mostly horizontal spatial frequencies.

The example basis images in FIG. 10*a* contain very distinct vertical and horizontal components. Other transforms may not separate spatial frequencies into horizontal and vertical dimensions (or other dimensions of interest) as well as this example. For example, the KL transform basis images are image dependant and will vary from image to image. The variation of basis images from transform to transform may require analysis of the basis images in order to determine which basis images comprise all or mostly all spatial frequencies in the dimension in which filtering is desired. Analysis of a display's sensitivity to the basis images may be accomplished by inverse transformation of transformed images comprised of only one basis image coefficient and analyzing the amount of power necessary to display the single basis image on the display device of interest. By doing this, one can identify which basis images, and therefore which transform coefficients, the display device of interest is most power sensitive to.

Knowing the spatial frequency characteristics of the individual basis images, one may filter the transformed coefficients and target those coefficients that are the most demanding, in terms of power requirements, to display. For example, in reference to FIG. 10, if the display device is most sensitive to vertical spatial frequencies, then the transform coefficient $TC_{3,0}$ may be filtered first since it contains the highest vertical frequencies. An attenuation factor in this case may be zero for the TC3,0 coefficient. Other coefficients may be filtered in order of priority for how much power they require to be displayed. Linear filtering methods that multiply select coefficients by such attenuation factors may be used. The attenuation factors may be one (resulting in no change) for transform coefficients that are multipliers of low spatial frequency basis images. The attenuation factor may also be about one if the transform coefficient multiplies a basis image that does not contain or contains a small percentage of spatial frequencies that are being selectivlely filtered. The attenuation factor may be zero for the coefficients corresponding to basis images that the display is sensitive to. Nonlinear methods may also be used. Such nonlinear methods may include setting select coefficients to zero, and setting select coefficients to a threshold value if the transformed coefficient is greater than the threshold value. Other nonlinear methods are known to those of skill in the art.

The size of the image being filtered when performing transform domain filtering is dependent on the size of the image block that was transformed. For example, if the transformed coefficients resulted from transforming pixel values that correspond to an image space covering a 16×16 pixel block, then the filtering will affect only the 16×16 pixel image block that was transformed. Transforming a larger image block will result in more basis images, and therefore the more spatial frequencies that may be filtered. However, an 8×8 block may be sufficient to target the high frequencies that may advantageously attenuated for conserving power on certain displays, e.g., a display of interferometric modulators.

Regardless which domain the filtering is done in, one objective is to selectively filter spatial frequencies that require the most power to be displayed. For this reason, the filtering will be referred to herein as spatial frequency filtering. Similarly, the module performing the filtering, whether implemented as software, firmware or microchip circuitry, depending on the embodiment, will be referred to as a spatial frequency filter. More details of certain embodiments of spatial domain and transform domain methods for performing spatial frequency filtering will be discussed below.

FIG. 11 shows a flowchart illustrating an embodiment of a process for performing selective spatial frequency filtering of image data to be displayed on a display device. In one embodiment the spatial frequency filtering process 200 may be implemented in processor 21 of display device 40 shown in FIG. 6*b*. The spatial frequency filtering process 200 will be discussed with reference to FIGS. 6 and 11. The process 200 begins with the processor 21 receiving image data at step 205. The image data may be in the spatial domain or a transformed domain. The image data may comprise any of the several achromatic or chromatic image variables discussed above. The image data may be decompressed image data that was previously decoded in a video decoder in processor 21 and/or network interface 27. The image data may be compressed image data in a transformed domain such as JPEG and JPEG-2000 as well as MPEG-2, MPEG-4 and H.264 compressed video data.

After receiving the image data, the data may need to be transformed to another domain at step 210, if the spatial frequency filter domain is different that the domain of the received data. Processor 21 may perform the optional transformation acts of step 210. Step 210 may be omitted if the received image data is already in the domain in which filtering occurs. After the image data is in the filtering domain, the spatial frequency filtering occurs at step 215 (steps 230, 235 and 240 will be discussed below in reference to another embodiment). Spatial frequency filtering may be in the spatial domain or in the transformed domain. In the spatial domain, the linear and nonlinear filtering methods discussed above in reference to FIG. 9 may be used. In any of the transformed domains, the transformed coefficients may be filtered using linear and nonlinear methods as discussed above in reference to FIG. 10. The filtering at step 215, whether taking place in the spatial or the transformed domain, is designed to attenuate particular spatial frequencies in one dimension more than the particular spatial frequencies are attenuated in another dimension. The particular spatial frequencies being attenuated and the dimension in which they are being attenuated more, are chosen so as to reduce the power required to drive a display to display the filtered image data. Step 215 may be performed by software, firmware and/or hardware in processor 21 depending on the embodiment.

After filtering in step 215, it may be necessary to inverse transform the filtered data at step 220. If step 215 was performed in the spatial domain then the image data may be ready to provide to the display device at step 225. If the filtering was performed in a transform domain, the processor 21 will inverse transform the filtered data into the spatial domain. At step 225, the filtered image data is provided to the display device. The filtered image data input to step 225 is typically raw image data. Raw image data typically refers to the information that identifies the image characteristics at each location within an image. For example, such image characteristics can include color, saturation, and gray-scale level. In one embodiment, actions taken in step 225 comprise the driver controller 29 taking the filtered image data generated by the processor 21 either directly from the processor 21 or from the frame buffer 28 and reformatting the filtered image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22 to drive the display array 30 to display the filtered image data.

In one embodiment, image data is provided to the display array 30 by the array driver 22 in a row-by-row fashion. In this embodiment, the display array 30 is driven by column signals and row pulses as discussed above in reference to and illustrated in FIGS. 4, 5 and 8. This results in the display array 30 requiring more power to be driven to display the particular frequencies in the vertical dimension being primarily filtered in step 215 than to display the particular frequencies in other dimensions. In this case the spatial frequencies being primarily filtered in step 215 are vertical frequencies substantially orthogonal to the horizontal rows driving the display array 30.

In another embodiment, image data is provided to the display array 30 by the array driver 22 in a column-by-column fashion. In this embodiment, the display array 30 is driven by row signals and column pulses essentially switched (i.e., high frequency row switching and low frequency column pulses) from the protocol discussed above in reference to and illustrated in FIGS. 4, 5 and 8. This results in the display array 30 requiring more power to be driven to display the particular frequencies in the horizontal dimension being primarily filtered in step 215 than to display the particular frequencies in other dimension. In this case the spatial frequencies being primarily filtered in step 215 are horizontal frequencies substantially orthogonal to the vertical columns driving the display array 30.

In one embodiment, the filtering of step 215 is dependent on an estimated remaining lifetime of a battery such as power supply 50. An estimation of remaining battery lifetime is made in step 230. The estimation may be made in the driver controller 29 based on measured voltages from power supply 50. Methods of estimating the remaining lifetime of a power supply are known to those of skill in the art and will not be discussed in detail. Decision block 235 checks to see if the remaining battery lifetime is below a threshold value. If it is below the threshold than the process flow continues on to filtering spatial frequencies at step 215 in order to preserve the remaining battery life. If decision block 235 does not find the estimated battery lifetime to be below the threshold, then the filtering step 215 is bypassed. In this way, higher quality images can be viewed until battery power is low.

In another embodiment, decision block 235 checks if the estimated battery life is below multiple thresholds and filter parameter may be set at step 240 depending on which threshold the estimate falls below. For example, if the estimated battery life is below a first threshold than step 215 filters spatial frequencies using a first parameter set. If the estimated battery life is below a second threshold than step 215 filters spatial frequencies using a second parameter set. In one aspect of this embodiment, the first threshold is higher (higher meaning there is more battery lifetime remaining) than the second threshold and the first parameter set results in less attenuation or smoothing of the particular frequencies than the second parameter set. In this way, more drastic filtering may result in more power savings as the estimated battery lifetime decreases. Battery life may be measured from a battery controller IC (integrated circuit).

In another embodiment, step 230 is replaced by an estimate of the power required to drive the display array 30 to display a specific image. The estimate may be made in the driver controller 29. The estimate may be made by using equations such as equations (2) and (3) above that depend on the driver protocol. In this embodiment, decision block 235 may be replaced by a decision block that checks the estimated power to display the image to a threshold. If the estimated power exceeds the threshold then filtering will be performed at step 215 to reduce the power required to display the image. If the estimated power is below the threshold, then the filtering step 215 is omitted. Multiple thresholds may be utilized in other embodiments similar to the multiple battery lifetime thresholds discussed above. Multiple filtering parameter sets may be set at step 240 depending on which estimated power threshold is exceeded. Depending on the embodiment, selected steps of process 200 illustrated in FIG. 11 may be removed, added or rearranged.

In another embodiment, the spatial frequency filtering process 200 may be performed at multiple points in a decoding process for decompressing compressed image and/or video data. Such compressed image and/or video data may be compressed using JPEG, JPEG-2000, MPEG-2, MPEG 4, H.264 encoders as well as other image and video compression algorithms. FIG. 12 shows a system block diagram illustrating an embodiment of a visual display device 40 for decoding compressed video/image data and performing selective spatial frequency filtering of the video/image data (referred to herein as image data). Compressed image data is received by network interface 27 (see FIG. 6*b*). Symbol decoder 105 decodes the symbols of the compressed image data. The symbols may be encoded using variable run length codes such as Huffman codes, algebraic codes, context aware variable length codes and others known to those in the art. Since some of the context aware codes depend on the context (contexts may include characteristics of already decoded neighboring images) of other decoded images, the symbol decoding for some image sub-blocks may have to occur after the context dependent blocks are decoded. Some of the symbols comprise transformed image data such as DCT, H.264 integer transform, and others. The symbols representing transformed image data are inverse transformed in an inverse transform module 110 resulting in sub-images in the spatial domain. The sub-images may then be combined, at sub-image combiner 115, in various ways depending on how the sub-images are derived in relation to each other. Sub-images may be derived using spatial prediction where the sub-image data is derived in relation to another spatial area in the same image. Sub-images may also be derived using temporal prediction (e.g., in the case of predicted frames (P frames), bi-predicted frames (B frames) and other types of temporal prediction). In temporal prediction, the image data is derived in relation to another sub-image in another frame located prior to or subsequent to (or both) the current frame being decoded. Temporal prediction may use motion compensated prediction (see MPEG or H.264 standards). After the sub-images are combined, the decoding process is basically complete. An additional step of converting the decoded color space data to another format may be needed at color space converter 120. For example, Luminance and Chrominance values may be converted to RGB format. Display array driver 22 may then drive display array 30 as discussed above in relation to FIG. 6.

In addition to the compressed image decoder blocks 105, 110, 115 and 120, the display device 40 shown in FIG. 12, includes 4 spatial frequency filter modules 125*a*, 125*b*, 125*c* and 125*d*. The spatial frequency filter modules may each perform any or all steps of process 200 for filtering spatial frequencies of the image data at various points in the decoding process. In one aspect of this embodiment, the spatial frequency filter 125*a* performs spatial frequency filtering in the transform domain before the transform coefficients are inverse transformed. In this way, the inverse transform module 110 may not have to inverse transform selected coefficients if the spatial frequency filter 125*a* set their values to zero. In addition to saving power by displaying lower frequency images, this saves processing power in the decoding process. The spatial frequency filter 125*a* may perform any of the linear and/or nonlinear filtering methods discussed above. In another aspect of this embodiment, the spatial frequency filter 125*b* performs spatial frequency filtering in the spatial domain on the sub-images after the image transform module 110. In another aspect of this embodiment, the spatial frequency filter 125*c* performs spatial frequency filtering in the spatial domain on the whole image after the sub-images are combined in the sub-image combiner 115. In another aspect of this embodiment, the spatial frequency filter 125*d* performs spatial frequency filtering in the spatial domain on the whole image after the the image data has been converted to another color format in color space converter 120.

Performing the spatial frequency filtering in different areas of the decoding process may provide advantages depending on the embodiment of the display array 30. For example, the image size being filtered by filters 125*a* and 125*b* may be on a relatively small portion of image data, thereby limiting the choice of basis images and/or spatial frequencies represented in the sub-image space. In contrast, filters 125*c* and 125*d* may have a complete image to work with, thereby having many more spatial frequencies and/or basis images to choose from to selectively filter. Any of the filters 125 may be switched to filtering in another domain by performing a transform, then filtering in the new domain, then inverse transforming to the old domain. In this way, spatial and/or transformed filtering may be performed at any point in the decoding process.

Having several candidate places to perform spatial frequency filtering and having multiple domains in which to filter gives a designer a great deal of flexibility in optimizing the filtering to best filter the particular frequencies in the selected dimensions to provide for power saving in the driving of the display array 30. In one embodiment, a system controller 130 controls the nature of the filtering (e.g., which domain filtering is performed in, which position in the decoding process the filtering is performed at, and what level of filtering is provided) performed by spatial frequency filters 125*a* through 125*d*. In one aspect of this embodiment, system controller 130 receives the estimated battery lifetime remaining for power supply 50 that is calculated in step 230 of process 200. In this aspect, the estimated battery lifetime is calculated in another module such as the driver controller 29. In another aspect of this embodiment, system controller 130 estimates the battery lifetime remaining. The estimated battery lifetime may be utilized by system controller 130 to determine the filtering parameter sets based on estimated battery lifetime thresholds as discussed above (see discussion of decision block 235 and step 240). These filtering parameter sets may be transmitted to one or more of the spatial frequency filters 125*a* through 125*d*. In another aspect of this embodiment, system controller 130 receives an estimate of the power required to drive the display array 30 to display a specific image (this power estimate may replace the battery lifetime estimate at step 230). The estimate may be made in the driver controller 29. If the estimated power exceeds a threshold then decision block 235 will direct flow such that filtering be performed at step 215 to reduce the power required to display the image. If the estimated power is below the threshold, then the filtering step 215 is omitted. Multiple thresholds may be utilized in other embodiments similar to the multiple battery lifetime thresholds discussed above. Multiple filtering parameter sets may be set at step 240 depending on which estimated power threshold is exceeded. System controller 130 may be software, firmware and/or hardware implemented in, e.g., the processor 21 and/or the driver controller 29.

FIG. 13 is a system block diagram illustrating another embodiment of a visual display device for decoding compressed video/image data and performing selective spatial frequency filtering of the video/image data. In one aspect of this embodiment, spatial frequency filtering is performed in a transformed domain with vertical frequency decimation. In another aspect of this embodiment, spatial frequency filtering is performed in the spatial domain. In yet another aspect of this embodiment, system controller 130 (see FIG. 12) is replaced by an IMOD (interferometric modulator) power estimator control component. The IMOD power estimator control component receives a battery lifetime estimate and determines the filtering parameter sets based on the estimated battery lifetime.

An embodiment of an apparatus for processing image data includes means for displaying image data, the displaying means requiring more power to display image data comprising particular spatial frequencies in a first dimension, than to display image data comprising the particular spatial frequencies in a second dimension. The apparatus further includes means for receiving image data, means for filtering the received image data such that the image data at particular spatial frequencies in a first dimension are attenuated more than image data at the particular spatial frequencies in a second dimension are attenuated, so as to reduce power consumed by the displaying means, and driving means for providing the filtered image data to the displaying means. With reference to FIGS. 6*b* and 12, aspects of this embodiment include where the displaying means is display array 30 such as an array of interferometric modulators, where the means for receiving is network interface 27, where the means for filtering is at least one of spatial frequency filters 125*a* through 125*d*, and where the driving means is the display array driver 22.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A method of displaying data on a display device, the method comprising:

receiving image data having a number of pixels, the image data comprising particular spatial frequencies in a first dimension capable of being displayed on the display device and the particular spatial frequencies in a second dimension capable of being displayed on the display device;

estimating a remaining lifetime of a power supply;

setting filter parameters based on the estimated remaining lifetime of the power supply, wherein values of the filter parameters are increased as the estimated lifetime of the power supply decreases;

filtering the received image data using the filter parameters such that the particular spatial frequencies in the first dimension are smoothed more than the particular spatial frequencies in the second dimension are smoothed; and displaying the filtered image data on the display device, the filtered image data having the same number of pixels as the received image data.

2. The method of claim 1, wherein the filtering comprises spatial domain filtering.

3. The method of claim 1, wherein the filtering comprises filtering in a transformed domain.

4. The method of claim 3, wherein the received image data is in the transformed domain, the method further comprising:

inverse transforming the filtered image data, thereby resulting in spatial domain image data.

5. The method of claim 1, wherein the filtering comprises low pass filtering wherein lower spatial frequencies remain substantially unchanged after filtering.

6. The method of claim 1, further comprising estimating a power required to drive the display device to display the received image data, wherein the filter parameters are further based on the estimated power required.

7. The method of claim 3, wherein the transformed domain is one of a discrete Fourier transformed domain, a discrete cosine transformed domain, a Hadamard transformed domain, a discrete wavelet transformed domain, a discrete sine transformed domain, a Haar transformed domain, a slant transformed domain, a Karhunen-Loeve transformed domain and an H.264 integer transformed domain.

8. The method of claim 1, further comprising determining that the estimated remaining lifetime of the power supply is below a predetermined threshold, wherein the filter parameters are based on the determining that the estimated remaining lifetime of the power supply is below a predetermined threshold.

9. The method of claim 1, wherein the filtering comprises filtering the received image data primarily in the first dimension.

10. The method of claim 1, wherein the filtering comprises filtering the received image data only in the first dimension.

11. An apparatus for displaying image data, comprising:

a power supply;

a display device capable of displaying image data comprising particular spatial frequencies in a first dimension and the particular spatial frequencies in a second dimension;

a processor configured to receive image data having a number of pixels, the image data comprising the particular spatial frequencies in the first dimension and the particular spatial frequencies in the second dimension, to estimate a remaining lifetime of the power supply, to set filter parameters based on the estimated remaining lifetime of the power supply, and to filter the image data using the filter parameters such that the particular spatial frequencies in the first dimension are smoothed more than the particular spatial frequencies in the second dimension are smoothed, wherein values of the filter parameters are increased as the estimated lifetime of the power supply decreases; and at least one driver circuit configured to communicate with the processor and to drive the display device, the driver circuit further configured to provide the filtered image data to the display device, the filtered image data having the same number of pixels as the received image data.

12. The apparatus of claim 11, wherein the filtering is done in a spatial domain.

13. The apparatus of claim 11, wherein the filtering is done in a transformed domain.

14. The method of claim 13, wherein the processor is further configured to receive the image data in the transformed domain, and to inverse transform the filtered image data, thereby resulting in the filtered image data being in the spatial domain.

15. The apparatus of claim 11, wherein the processor is further configured to determine if the estimated remaining lifetime of the power supply is below a predetermined threshold and filter the image data based on the determining that the estimated remaining lifetime is below the predetermined threshold.

16. The apparatus of claim 11, wherein the display comprises an array of interferometric modulators.

17. The apparatus of claim 11, wherein the processor is further configured to estimate the power required to drive the display device to display the image data and to set the filter parameters based on the estimated power required.

18. The apparatus of claim 11, wherein the processor is further configured to estimate the power required to drive the display device to display the image data, to determine if the estimated power required is above a threshold and to filter the image data based on the determining that the estimated power required is above the threshold.

19. The apparatus of claim 11, wherein the filtering is done in a transformed domain, and filtering with a second parameter set attenuates lower spatial frequencies in the first dimension more than filtering with a first parameter set.

20. The apparatus of claim 11, wherein the filtering is done in a spatial domain, and filtering with a second parameter set combines more spatial coefficients in the first dimension than filtering with a first parameter set.

21. The apparatus of claim 11, wherein the filtering comprises low pass filtering that results in lower spatial frequencies remaining substantially unchanged after filtering.

22. The apparatus of claim 13, wherein the transformed domain is one of a discrete Fourier transformed domain, a discrete cosine transformed domain, a Hadamard transformed domain, a discrete wavelet transformed domain, a discrete sine transformed domain, a Haar transformed domain, a slant transformed domain, a Karhunen-Loeve transformed domain and an H.264 integer transformed domain.

23. The apparatus of claim 11, further comprising:

a memory device in electrical communication with the processor.

24. The apparatus of claim 23, further comprising a controller configured to send at least a portion of the filtered image data to the driver circuit.

25. The apparatus of claim 23, further comprising an image source module configured to send the image data to the processor.

26. The apparatus of claim 25, wherein the image source module comprises at least one of a receiver, transceiver, and transmitter.

27. The apparatus of claim 23, further comprising an input device configured to receive input data and to communicate the input data to the processor.

28. The apparatus of claim 11, wherein the processor is configured to filter the image data by filtering the image data primarily in the first dimension.

29. The apparatus of claim 11, wherein the processor is configured to filter the image data by filtering the image data only in the first dimension.

30. An apparatus for processing image data, comprising:

means for supplying power;

means for displaying image data comprising particular spatial frequencies in a first dimension and the particular spatial frequencies in a second dimension;

means for receiving image data having a number of pixels, the image data comprising the particular spatial frequencies in the first dimension and the particular spatial frequencies in the second dimension;

means for estimating a remaining lifetime of the means for supplying power;

means for setting filter parameters based on the estimated remaining lifetime of the power supply, wherein values of the filter parameters are increased as the estimated lifetime of the power supply decreases;

means for filtering the received image data using the filter parameters such that the particular spatial frequencies in the first dimension are smoothed more than the particular spatial frequencies in the second dimension are smoothed; and means for providing the filtered image data to the means for displaying, the filtered image data having the same number of pixels as the received image data.

31. The apparatus of claim 30, wherein the means for receiving comprises a network interface.

32. The apparatus of claim 30, wherein the means for displaying comprises an array of interferometric modulators.

33. The apparatus of claim 30, wherein the means for providing comprises at least one driver circuit.

34. The apparatus of claim 30, wherein the means for filtering filters the image data by filtering the image data primarily in the first dimension.

35. The apparatus of claim 30, wherein the means for filtering filters the image data by filtering the image data only in the first dimension.

* * * * *